United States Patent [19]

Yamagata et al.

[11] Patent Number: 5,237,603
[45] Date of Patent: Aug. 17, 1993

[54] CORDLESS TELEPHONE WHICH INTERMITTENTLY MONITORS PREDETERMINED CHANNELS FROM ALL AVAILABLE CHANNELS

[75] Inventors: Masato Yamagata; Yoshikazu Tanaka, both of Kanagawa, Japan

[73] Assignee: Sony Corporation, Tokyo, Japan

[21] Appl. No.: 965,044

[22] Filed: Oct. 22, 1992

Related U.S. Application Data

[63] Continuation of Ser. No. 621,846, Dec. 4, 1990, abandoned.

[30] Foreign Application Priority Data

Dec. 11, 1989 [JP] Japan .................................. 1-321117
Dec. 12, 1989 [JP] Japan .................................. 1-322025

[51] Int. Cl.$^5$ .................................................. H04M 11/00
[52] U.S. Cl. ............................................ 379/61; 455/34.1;
455/38.3
[58] Field of Search ............................... 379/58, 61-63;
455/34.1, 34.2, 38.3, 54.2, 127, 343

[56] References Cited

U.S. PATENT DOCUMENTS

| | | | |
|---|---|---|---|
| 4,894,856 | 1/1990 | Nakanishi et al. | 455/321 |
| 5,023,932 | 6/1991 | Wakana | 379/61 |
| 5,097,500 | 3/1992 | Itoh | 379/62 |

FOREIGN PATENT DOCUMENTS

| | | |
|---|---|---|
| 0137943 | 4/1985 | European Pat. Off. |
| 0258739 | 3/1988 | European Pat. Off. |
| 0282087 | 9/1988 | European Pat. Off. |
| 0170135 | 7/1989 | Japan ............................. 455/34 |
| 8502738 | 6/1985 | World Int. Prop. O. ............ 379/63 |

OTHER PUBLICATIONS

Patent Abstracts of Japan vol. 10, No. 313 (E-448) Oct. 24, 1986 & JP-A-61 123 326 (Matsushita Electric Ind. Co.)
Patent Abstracts of Japan vol. 12, No. 357 (E-662) Sep. 26, 1988 & JP-A-63 114 327 (Juki Corp.).

Primary Examiner—Curtis Kuntz
Assistant Examiner—Dwayne D. Bost
Attorney, Agent, or Firm—William S. Frommer; Alvin Sinderbrand

[57] ABSTRACT

A cordless telephone having a base unit connected to a telephone line network, a handset unit operable for communicating with the base unit by way of radio waves, a device for establishing a standby mode in which the handset unit intermittently monitors at least one predetermined channel in a standby mode and for alternatively establishing a low power sleep mode, a device at the base unit for detecting the arrival of an incoming call from the telephone line network and for informing the remote handset unit of the arrival through the predetermined channel, a device for exchanging information between the base unit and the handset unit identifying respective available channels thereof and a device for storing information identifying at least one of the available channels which is the same for both the base unit and the remote handset unit, and which constitutes the at least one predetermined channel which is intermittently monitored by the handset unit in the standby mode.

5 Claims, 16 Drawing Sheets

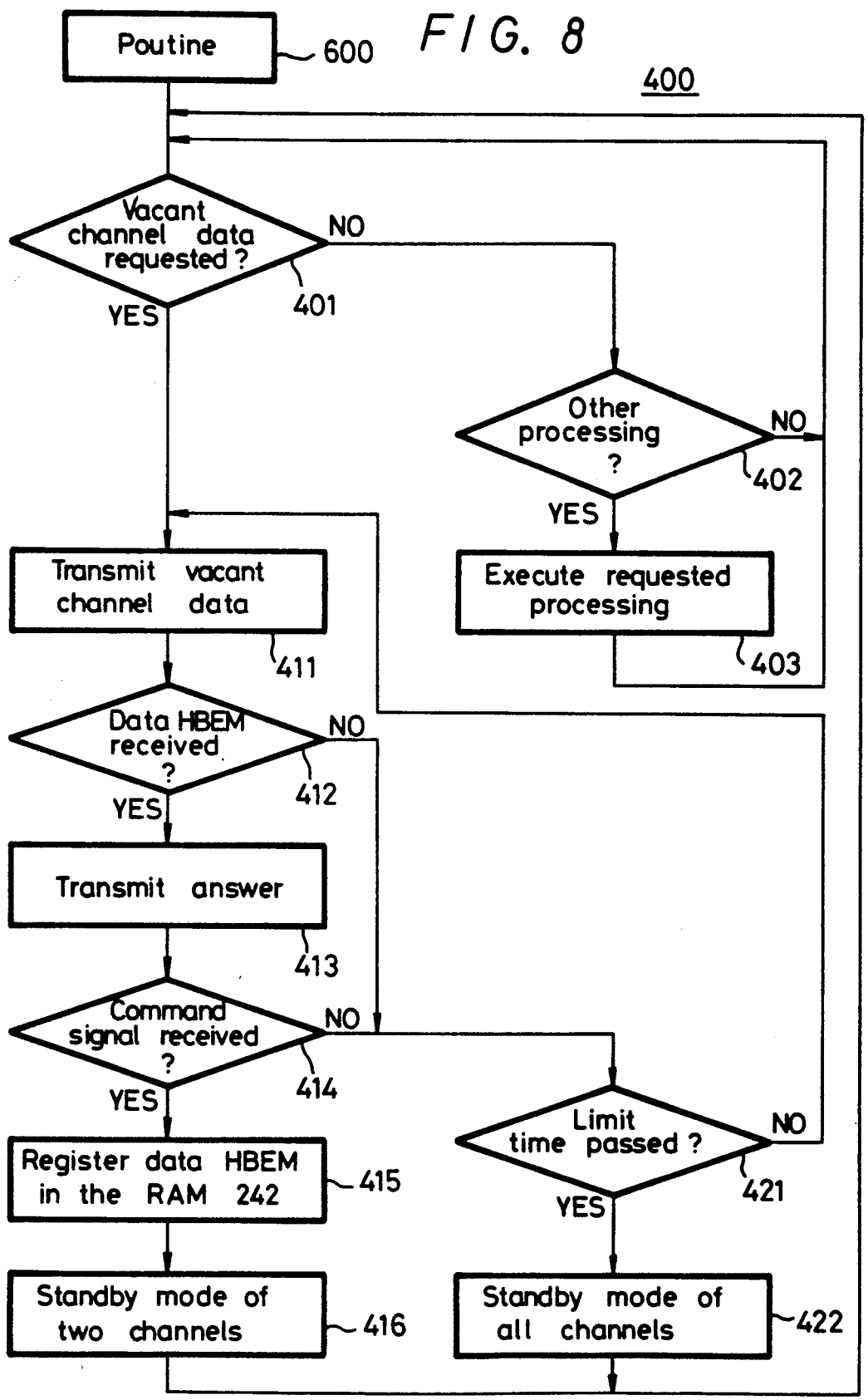

FIG. 12 (PRIOR ART)

| Channel No. | Transmission Frequency of Handset Unit Reception Frequency of Base Unit | Reception Frequency of Handset Unit Transmission Frequency of Base Unit |
|---|---|---|
| 1 | 49.67 [MHz] | 46.61 [MHz] |
| 2 | 49.845 | 46.63 |
| 3 | 49.86 | 46.67 |
| 4 | 49.77 | 46.71 |
| 5 | 49.875 | 46.73 |
| 6 | 49.83 | 46.77 |
| 7 | 49.89 | 46.83 |
| 8 | 49.93 | 46.87 |
| 9 | 49.99 | 46.93 |
| 10 | 49.97 | 46.97 |

CORDLESS TELEPHONE WHICH INTERMITTENTLY MONITORS PREDETERMINED CHANNELS FROM ALL AVAILABLE CHANNELS

This application is a continuation of application Ser. No. 07/621,846, filed Dec. 4, 1990, now abandoned.

BACKGROUND OF THE INVENTION

1. Field of the Invention

The present invention relates to a cordless telephone.

2. Description of the Prior Art

In a low power cordless telephone available on the Japanese market, 87 communication channels and two control channels are available, in which each channel is a duplex channel.

In the standby mode of such conventional cordless telephone, a handset unit (remote station) intermittently receives and monitors a control channel having a predetermined frequency, whereupon when telephone communication is desired, the handset unit utilizes a communication channel specified by the control channel.

In Japan, there also exists a low power cordless telephone which does not use a control channel. Further, a cordless telephone used in the United States of America has 10 duplex channels, that is, channels 1-10, but does not have a control channel.

In the cordless telephones which do not have control channels as mentioned above and, as described, for example, in U.S. Pat. No. 4,768,219, the base unit (master station), which receives power from a commercially available power source, sequentially receives and monitors the first to tenth channels repeatedly when in a standby mode while awaiting a connection request from the handset unit.

The handset unit, while in the standby mode, also receives and monitors the first to tenth channels so as to determine if a connection request was sent from the base unit. As is to be appreciated, since the handset unit utilizes a battery as its power source and the handset unit continuously repeats the scanning of the 10 channels in the standby mode, the power consumption is considerably large and, as a result, the battery must be frequently changed. If, however, the handset unit utilizes a rechargeable battery, such rechargeable battery must still be frequently recharged, which may be very inconvenient for the user.

OBJECTS AND SUMMARY OF THE INVENTION

Accordingly, it is an object of the present invention to provide an improved cordless telephone which can eliminate the aforenoted shortcomings and disadvantages encountered with the prior art.

More specifically, it is an object of the present invention to provide a cordless telephone in which the power consumption of a handset unit can be considerably reduced.

It is another object of the present invention to provide a cordless telephone in which the channels to be received and monitored are automatically registered in a master station and a remote station.

According to an aspect of the present invention, a cordless telephone comprises a base unit connected to a telephone line network, a handset unit operable for communicating with the base unit by way of radio waves, means for establishing a standby mode in which said handset unit intermittently monitors at least one predetermined channel and for alternatively establishing a low power sleep mode, means at the base unit for detecting the arrival of an incoming call from the telephone line network and for informing the remote handset unit of the arrival through the predetermined channel, means for exchanging information between the base unit and the handset unit identifying respective available channels thereof, and means for storing information identifying at least one of the available channels which is the same for both the base unit and the remote handset unit, and which constitutes the at least one predetermined channel which is intermittently monitored by the handset unit in the standby mode.

According to another aspect of the present invention, a cordless telephone comprises a base unit connected to a telephone line network, a handset unit operable for communicating with the base unit by way of radio waves, power supply means for each of the base and handset units, reset means connected between each of the base and the handset units and the respective one of the power supply means for detecting initiation of operation of the respective power supply means, means for establishing a standby mode in which the handset unit intermittently monitors at least one predetermined channel and for alternatively establishing a low power sleep mode, means at the base unit for detecting the arrival of an incoming call from the telephone line network and for informing the remote handset unit of the arrival through the predetermined channel, means for exchanging information between the bas unit and the handset unit identifying respective available channels thereof when the reset means detects initiation of operation of the power supply means for the base unit or the handset unit, respectively, and means for storing information identifying at least one the available channels which is the same for both the base unit and the remote handset unit, and which constitutes the at least one predetermined channel which is intermittently monitored by the handset unit in the standby mode.

In accordance with a further aspect of the present invention, a cordless telephone comprises a base unit connected to a telephone line network, a handset unit operable for communicating with the base unit by way of radio waves, means for establishing a standby mode in which the handset unit intermittently monitors at least one predetermined channel and for alternatively establishing a low power sleep mode, means at the base unit for detecting the arrival of an incoming call from the telephone line network and for informing the remote handset unit of the arrival through the predetermined channel, means for exchanging information between the base unit and the handset unit identifying respective available channels thereof when a telephone conversation is completed and means for storing information identifying at least one of the available channels which is the same for both the base unit and the remote handset unit, and which constitutes the at least one predetermined channel which is intermittently monitored by the handset unit in the standby mode.

The above, and other objects, features and advantages of the present invention will be apparent from the following detailed description of the illustrative embodiments when read in conjunction with the accompanying drawings, in which the same reference numerals are used to identify corresponding parts.

BRIEF DESCRIPTION OF THE DRAWINGS

FIG. 8 is a flowchart to which reference will be made in explaining an operation of a base unit when the base unit is operated in a normal condition;

FIG. 12 is a chart showing the relationship between the channel numbers and the transmission and reception frequencies of the handset unit and base unit;

DETAILED DESCRIPTION OF THE PREFERRED EMBODIMENTS

The preferred embodiments of the present invention will now be described with reference to the accompanying drawings.

Figure 1:
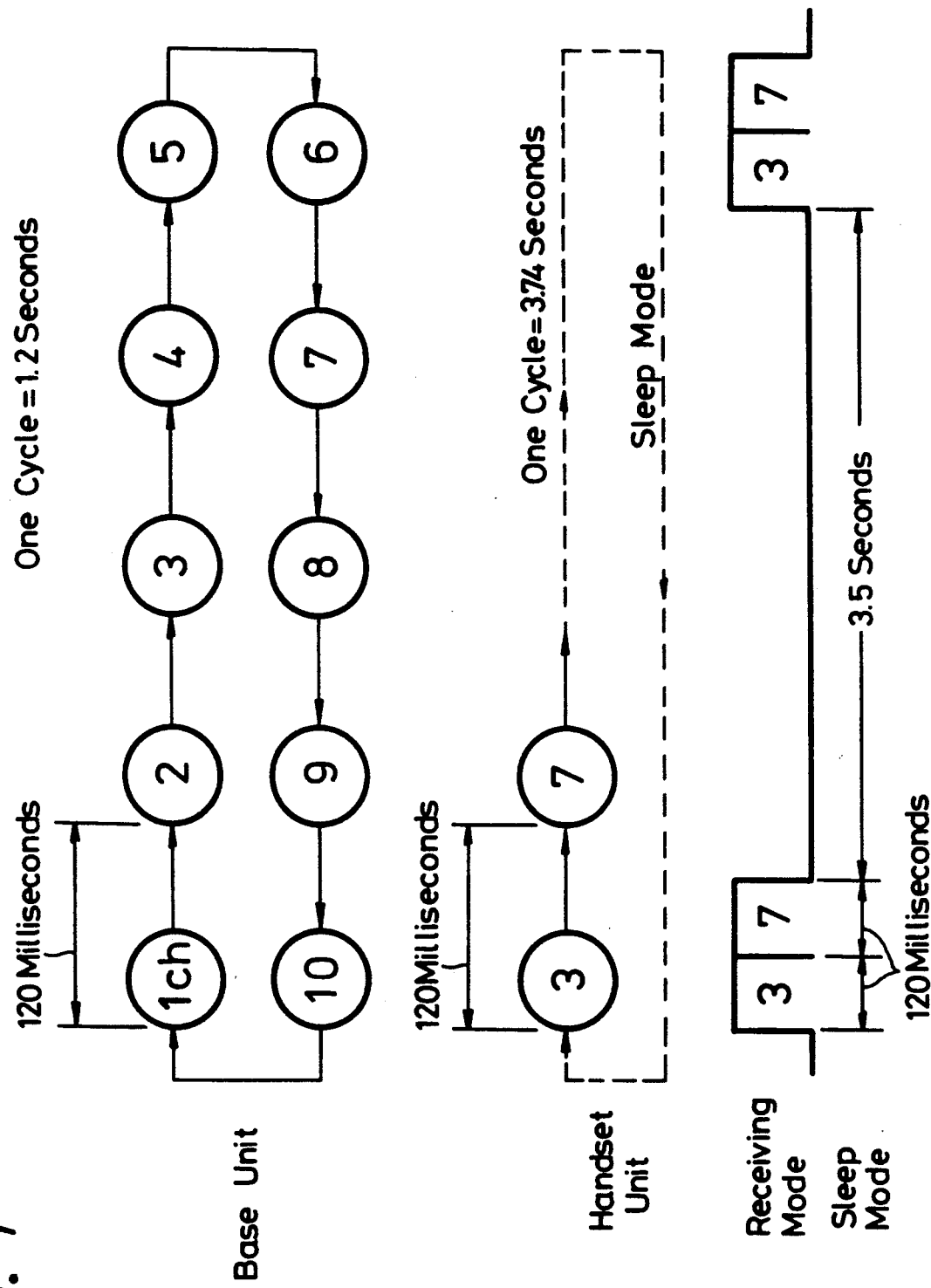
FIG. 1 is a timing chart used to explain a way of reducing the power consumption of a battery of a handset unit of a cordless telephone having no control channels.

In the cordless telephone having no control channels, as previously described, the power consumption of the battery used in the handset unit may be reduced by the method of FIG. 1. Therefore, the hereinafter described embodiment of the present invention may be applied to the cordless telephone systems currently available on the U.S. market.

The base unit of the present cordless telephone is powered by a commercially available AC power source. In the standby mode, the first to tenth channels are sequentially received and monitored repeatedly while awaiting a connection request from the handset unit. The time necessary for detecting the connection request from the handset unit is approximately 120 milliseconds per channel. Accordingly, all the channels are scanned in a cycle of approximately 1.2 seconds.

In the standby mode, the present handset unit receives and monitors predetermined channels, for example, the third and seventh channels for checking whether or not a connection request from the base unit was sent. If no such connection request is received, then the handset unit enters a sleep mode of, for example, about 3.5 seconds. This cycle is repeatedly performed by the handset unit.

Accordingly, the handset unit is placed in the sleep mode during most of the standby mode. Therefore, the battery power consumption is reduced.

An arrangement and operation of an embodiment of the present cordless telephone will now be more fully described. In this embodiment, the channels that the handset unit receives and monitors are the third and seventh channels. However, as is to be appreciated, other channels may also be used.

Figure 2:
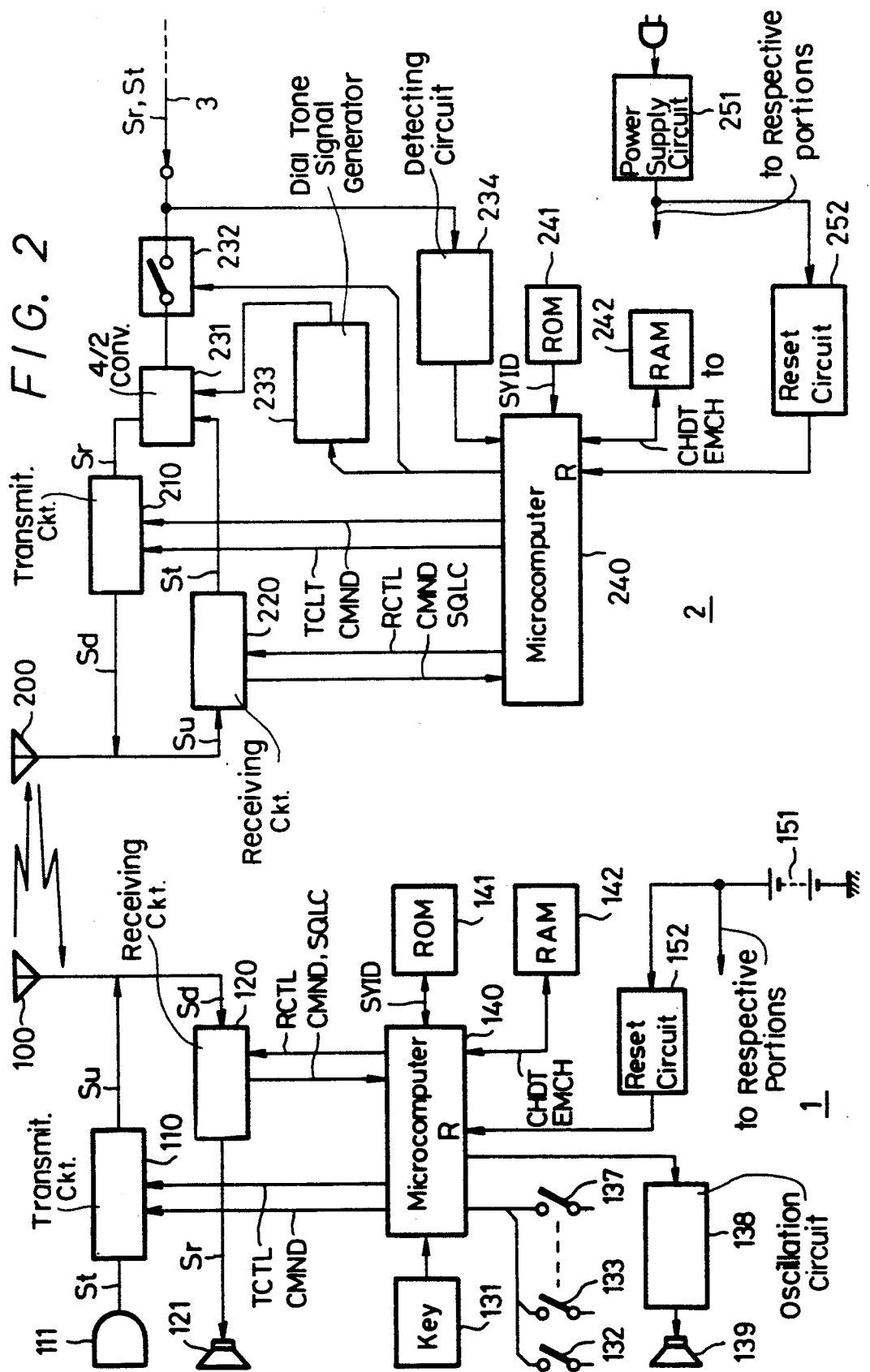
FIG. 2 is a schematic block diagram of a cordless telephone according to an embodiment of the present invention.

In FIG. 2, reference numerals 1, 2, and 3 generally designate a handset unit, a base unit and a telephone network line (external line), respectively.

In the handset unit 1 of FIG. 2, reference numerals 110 and 120 designate a transmitting circuit and a receiving circuit, respectively. The transmitting circuit 110 converts a sound signal St and a command signal CMND (described more fully later) into an FM (frequency modulated) up-channel signal Su and transmits the same. The receiving circuit 120 receives and demodulates an FM down-channel signal Sd to provide a sound signal Sr and the command signal CMND. Further, the receiving circuit 120 generates, by detecting, for example, an intermediate frequency signal, a detection signal SQLC which has a relatively low level value, for example "0", when receiving the FM down channel signal Sd. Incidentally, when the detection signal SQLC is at a relatively high level value, for example "1", the respective channel is vacant.

In the handset unit 1, reference numerals 131 and 132 designate a dial key and a talk key, respectively, in which the talk key 132 is a non-lock type push switch. Each time the talk key 132 is depressed, the handset unit 1 is alternately changed between the standby mode and the talk mode. In the standby mode, the handset unit 1 intermittently receives two channels, in this embodiment, the third channel and the seventh channel, and awaits a connection request from the base unit 2. In the talk mode, the handset unit 1 performs continuous reception and transmission between itself and the base unit 2.

Reference numerals 133 to 137 designate auxiliary keys such as a re-dialling key, hold key and so on which may be formed of non-lock push switches. Reference numeral 139 designates a speaker used for a ringer, a microcomputer 140 controls the entire system of the cordless telephone and may, for example, be a onechip microcomputer model No. μPD75108 manufactured by the NEC Corporation. The microcomputer 140 generates the command signal CMND which is transmitted by the transmitting Circuit 110, and identifies the command signal CMND and the detection signal SQLC obtained from the receiving circuit 120. Further, the microcomputer 140 generates control signals TCTL and RCTL that are used to respectively permit or inhibit the transmission and reception operations of the transmitting circuit 110 and the receiving circuit 120, and also designates a channel as hereinafter described.

Reference numerals 141 and 142 designate memories, that is, memory 141 is a read only memory (ROM) which stores therein a system identifying code SYID of 25 bits used to identify this cordless telephone from other cordless telephones. The memory 142 is a random access memory (RAM) for storing therein channel data CHDT which indicates the channel or channels which may be received by the handset unit 1, for example, the third and seventh channels, in the standby mode as described above.

Reference numeral 151 designates a battery which is preferably a rechargeable battery, such as a nickel-cadmium battery. An output voltage signal from battery 151 is supplied to respective portions of the handset unit 1, thus providing the operative voltage signals thereto. Further, reference numeral 152 designates an initial reset circuit.

The base unit 2 includes a transmitting circuit 210 and a receiving circuit 220 which are substantially the same as the transmitting circuit 110 and the receiving circuit 120, respectively, of the handset unit 1. In the standby mode, the receiving circuit 220 awaits an incoming call from the telephone network line 3 and also is scanning all up-channels in order to receive a connection request from the handset unit 1. In the talk mode, the base unit 2 performs continuous reception and transmission between itself and the handset unit 1.

In the base unit 2, reference numerals 231, 232, 233 and 234 designate a four line to two line converting circuit, a switch circuit which corresponds to a hook switch of a standard telephone set, a dial tone signal (DTFM) generating circuit and a ring tone signal detecting circuit, respectively.

A system control microcomputer 240 performs similar processings to those of the microcomputer 140 and also controls the operation of the entire system of this cordless telephone. As with microcomputer 140, microcomputer 240 may be a one-chip microcomputer model No. μPD75108 manufactured by the NEC Corporation. Reference numerals 241 and 242 designate memories which correspond to the memories 141 and 142, respectively. The ROM 241 stores therein the system identifying code SYID and the RAM 242 stores therein the data CHDT which indicates the channel or channels which the handset unit 1 receives and monitors.

Reference numeral 251 designates a power supply source circuit which converts a commercially available AC voltage signal into a predetermined DC voltage signal and supplies the predetermined DC voltage signal to respective portions of the base unit 2, thus providing the operating voltage signals thereto. Further, reference numeral 252 designates an initial reset circuit.

Figure 3:
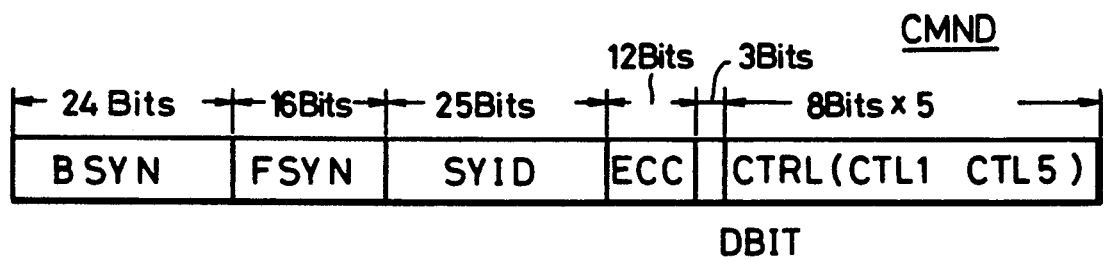
FIG. 3 is a diagram of a signal format used in the present invention.

FIG. 3 shows an example of a signal format of the command signal CMND. This formatted command signal CMND includes a bit synchronizing signal BSYN of 24 bits at the head thereof and a frame synchronizing signal FSYN of 16 bits. In this example, the bit synchronizing signal BSYN and the frame synchronizing signal FSYN have specific bit patterns which may be expressed as follows:

BSYN="10101010 ... 10"
FSYN="1100010011010110"... up-channel
FSYN="1001001100110110"... down-channel

Following the signal FSYN, the command signal CMND further includes a system identifying code SYID of 25 bits, an error correction code ECC of 12 bits for this system's identifying code SYID, a dummy bit DBIT of 3 bits and a control code CTRL of 5 bytes, in this order.

In the control code CTRL of 5 bytes, the first byte CTL1 is a code indicative of the control contents of the handset unit 1 and the base unit 2, and the second byte CTL2 to fifth byte CTL5 are parameters or data associated with the first byte CTL1.

When the handset unit 1 or the base unit 2 receives the command signal CMND, the microcomputer 140 or 240, respectively, determines whether or not the identifying code SYID in the command signal CMND coincides with the identifying code SYID stored in the ROM 141 or 241, respectively. When the respective identifying codes are coincident with each other, the command signal CMND is regarded as being valid, otherwise the command signal CMND is regarded as being invalid.

Figure 4:
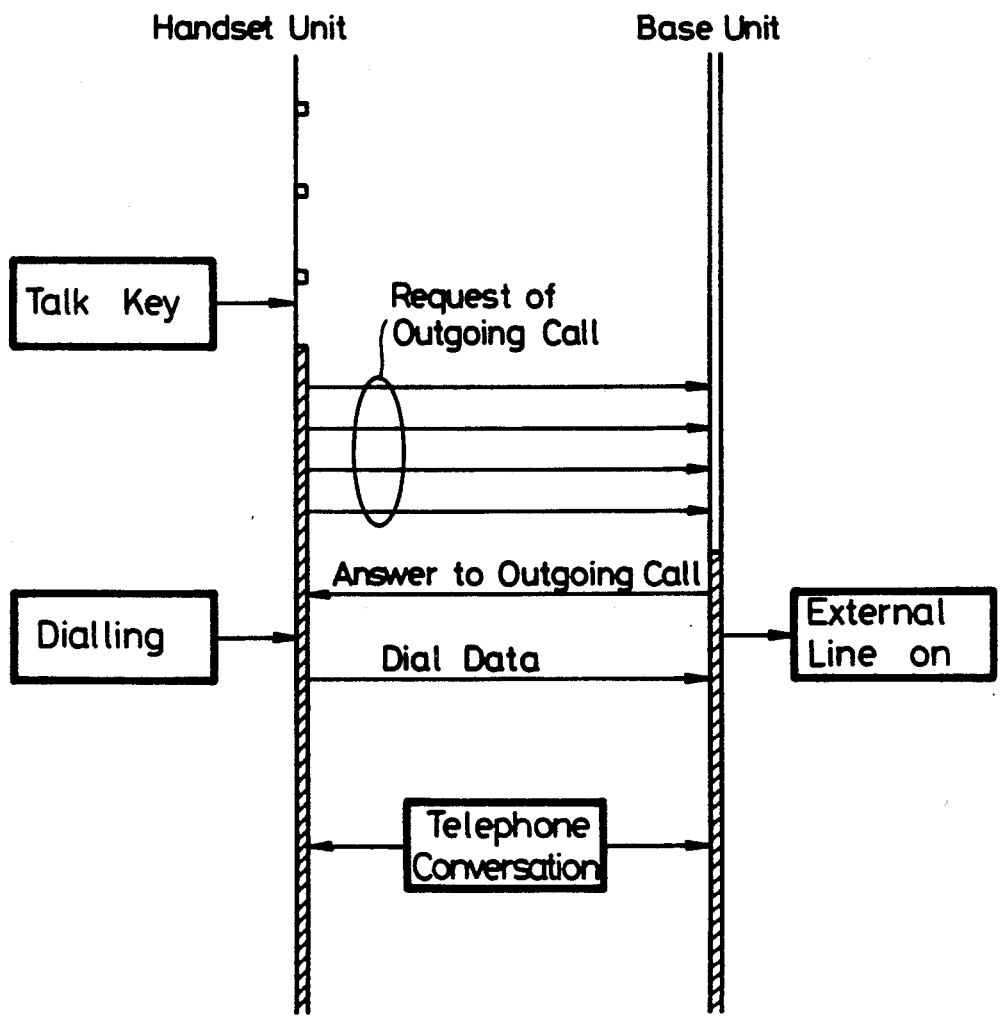
FIG. 4 is a diagram showing a sequence for an outgoing call.
Figure 6:
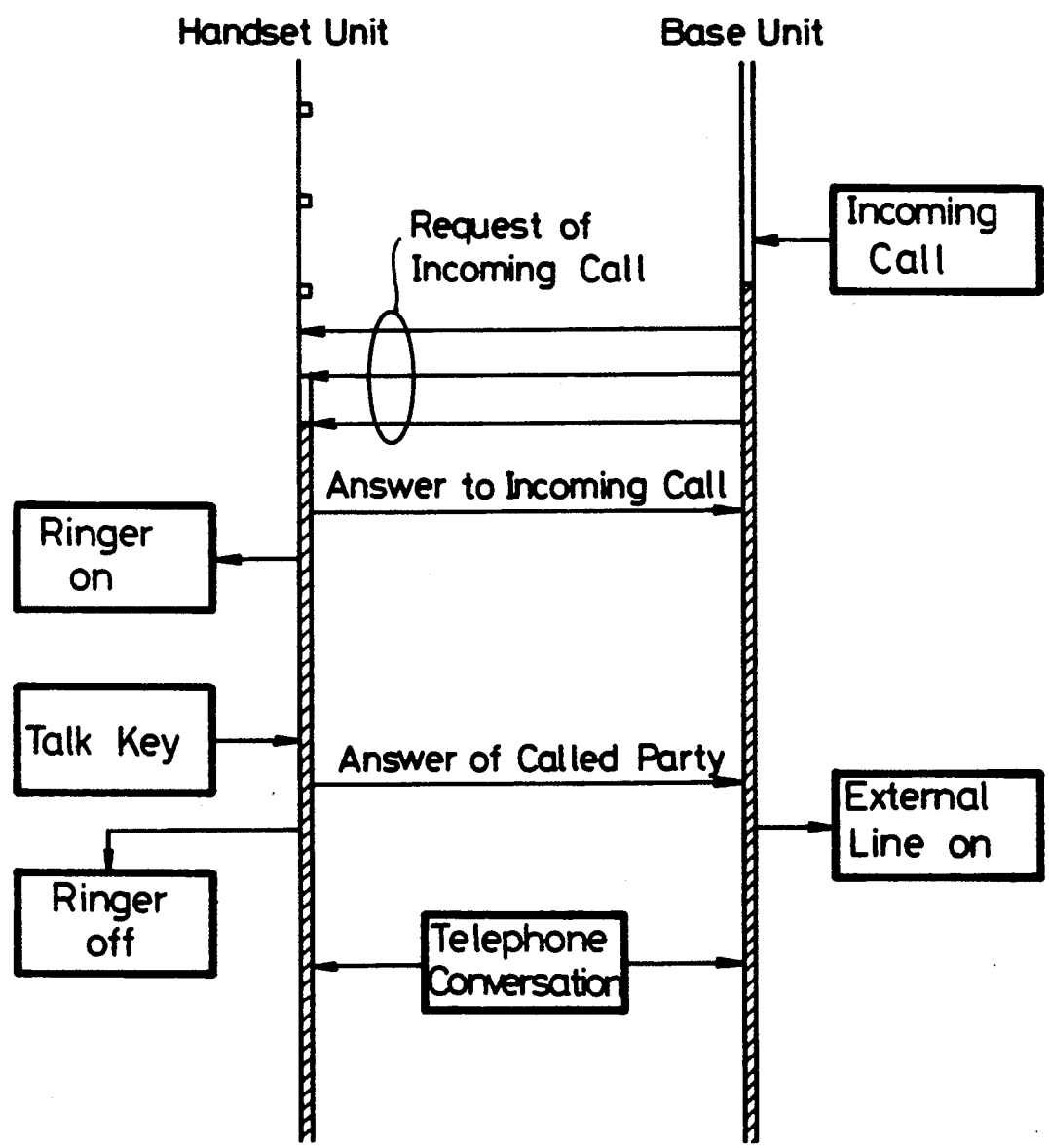
FIG. 6 is a diagram showing a sequence for an incoming call.

In the standby mode, the operations shown in FIG. 1 or the operations shown in the upper portions of FIGS. 4 and 6 are carried out.

Figure 5:
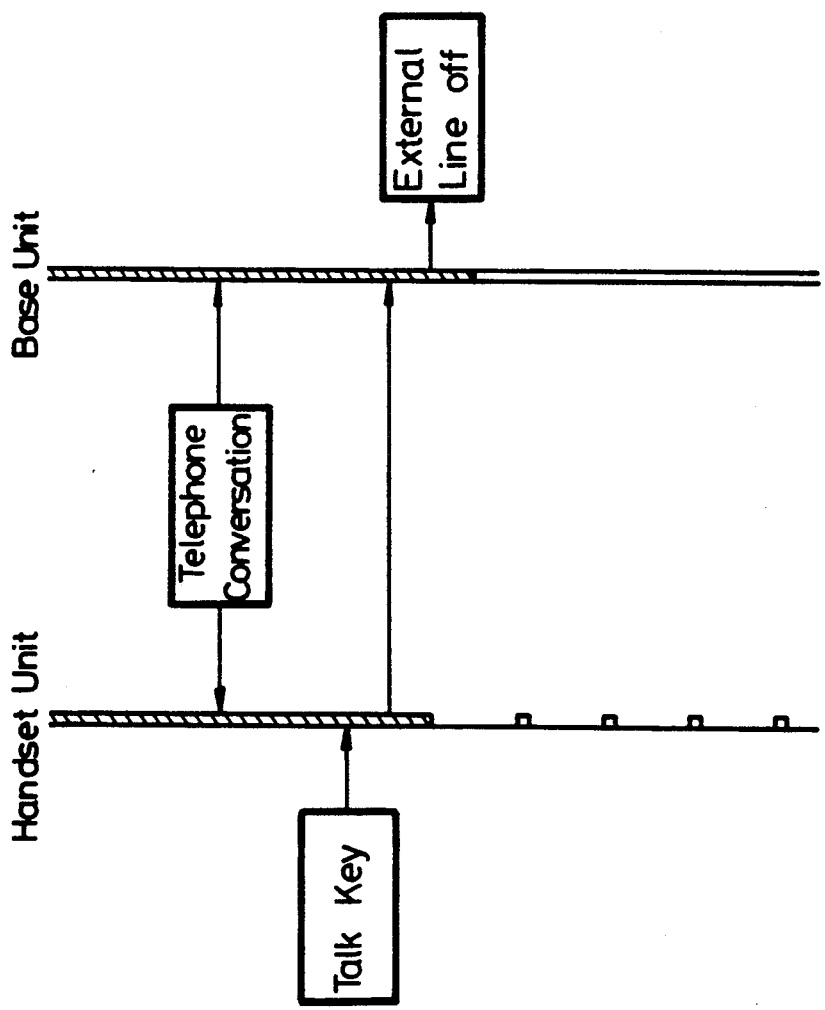
FIG. 5 is a diagram showing a sequence for a termination of a telephone conversation.

More specifically, in FIGS. 4 to 6, the solid lines in the vertical direction represent the conditions, along a time direction, of the handset unit 1 and the base unit 2. As is to be appreciated, these solid lines in the vertical direction are not drawn to scale along the time axis direction. The single solid line represents the sleep mode, the double solid line represents a mode in which only reception is permitted and the double solid line with the hatched portion represents a period in which transmission and reception are permitted.

The handset unit 1 alternately and intermittently receives and monitors the down third and seventh channels in accordance with the channel data CHDT stored in the RAM 142, while the base unit 2 repeatedly scans all up-channels.

An outgoing call from the handset unit 1 to the external line 3 is performed as in the connection sequence shown in FIG. 4.

More specifically, if talk key 132 is depressed while the handset unit 1 is set in the standby mode, the depression of the talk key 132 is detected by the microcomputer 140 and, as a result, the receiving circuit 120 is made operative to receive the down third channel or the down seventh channel as indicated by the channel data CHDT stored in the RAM 142. That is, if one of the above-mentioned channels, for example, the third channel is vacant, the reception channel of the receiving circuit 120 is fixed to the down third channel and continuous reception is thereafter permitted. Further, the transmitting circuit 110 is permitted to transmit through the up third channel, thus placing the handset unit 1 in the talk mode on the third channel.

A command signal CMND, having a control code CTRL which requests the outgoing call, is then repeatedly supplied from the microcomputer 140 to the transmitting circuit 110, so as to be converted to the FM signal Su of the up third channel and transmitted to the base unit 2 via an antenna 100.

In the base unit 2, the signal Su, which is in the form of radio waves, is received by an antenna 200 and supplied to receiving circuit 220. Concurrently therewith, the receiving circuit 220 is repeatedly scanning all up channels so that, when the reception channel becomes the third channel, the receiving circuit 220 senses the arrival of signal Su and, as a result, generates the detection signal SQLC. The scanning of the receiving circuit 220 is then stopped at the third channel, whereupon the receiving circuit 220 demodulates the FM signal Su so as to provide the command signal CMND. This command signal CMND is supplied to the microcomputer 240 which determines whether or not the identifying code SYID in the command signal CMND coincides with the identifying code SYID stored in the ROM 241.

In this case, since the identifying codes SYID are coincident with each other and the control code CTRL in the command signal CMND indicates the request of an outgoing call, the transmitting circuit 210 is permitted by the microcomputer 240 to transmit in the corresponding channel in which the FM signal Su is received, that is, the down third channel. Accordingly, the base unit 2 is also placed in the talk mode on the third channel. A command signal which answers the request of the outgoing call is then supplied from the microcomputer 240 to the transmitting circuit 210, so as to be converted into an FM signal Sd of the down third channel and transmitted to the handset unit 1 via the antenna 200.

The FM signal Sd transmitted from the base unit 2 to the handset unit 1 through the down third channel is received by the antenna 100 and supplied to the receiving circuit 120, whereupon the command signal CMND is generated from the receiving circuit 120 and supplied to the microcomputer 140.

Since the identifying code SYID in the command signal CMND is coincident with the identifying code SYID stored in the ROM 141 and the control code CTRL in the command signal CMND indicates the answer to the request of the outgoing call, the transmitting circuit 110 and the receiving circuit 120 are now definitely set in the talk mode in the third channel.

Accordingly, the handset unit 1 and the base unit 2 are connected via the third channel.

Further, in the base unit 2, the switch circuit 232 is placed in the off hook mode, whereby the transmitting circuit 210 and the receiving circuit 220 are connected to the telephone network line 3 via the converting circuit 231 and the switch circuit 232.

Therefore, the handset unit 1 is connected to the telephone network line 3 vial the base unit 2.

The user may now input a telephone number of a party to be called by using the dial key 131 of the handset unit 1. As a result, the command signal CMND, whose control code CTRL indicates the transmission of a telephone number and the corresponding telephone number, is generated and converted to the up channel FM signal Su and transmitted.

Accordingly, in the base unit 2, the receiving circuit 220 receives the Su signal and generates the command signal CMND, in which the control code CTRL of this command signal indicates the transmission of the telephone number and the corresponding telephone number. As a result, the generating circuit 233, which is controlled by the microcomputer 240, generates a dial tone signal corresponding to the telephone number supplied thereto from the handset unit 1. This dial tone signal is transmitted through the converting circuit 231 and the switch circuit 232 to the telephone network line 3.

When the called phone is answered, an audio signal Sr from the party being called is supplied to the transmitting circuit 210 via a signal line formed of the telephone network line 3, the switch circuit 232 and the converting circuit 231, in that order. This audio signal Sr is therein converted into the FM down channel signal Sd and transmitted by way of the antenna 200.

This signal Sd is received by way of antenna 100 of the handset unit 1 and supplied to the receiving circuit 120, whereupon the audio signal Sr is derived and supplied to the telephone receiver 121.

On the other hand, an audio signal St from the telephone transmitter 111 is supplied to the transmitting circuit 110, so as to be converted into the FM Su signal of the up channel and transmitted by way of the antenna 100 to the base unit 2.

This signal Su is received by antenna 200 of the base unit 2 and supplied to receiving circuit 220, whereupon the signal St is generated. This signal St is supplied to the telephone network line 3 via the converting circuit 231 and the switch circuit 232, and is then transmitted to the telephone set of the called party.

As shown in FIG. 5, if the talk key 132 of the handset unit 1 is depressed, so as to indicate the completion of the telephone conversation, the command signal CMND whose control code CTRL indicates the termination of the telephone communication is generated and transmitted to the base unit 2 on the FM signal Su of the up channel.

The receiving circuit 220 of the base unit 2 derives this command signal CMND and supplies the same to the microcomputer 240 which, in turn, determines that the telephone communication is finished. As a result, the transmitting circuit 210 is inhibited from transmitting and the receiving circuit 220 is placed in the standby mode in which it repeatedly scans all up channels. The switch circuit 232 is placed in the on hook mode.

Further, in the handset unit 1, after the command signal CMND whose control code CTRL indicates the end of the telephone communication has been transmitted, the transmitting circuit 110 is inhibited from transmitting and the receiving circuit 120 is placed in the standby mode in which it alternately and intermittently receives the down third and seventh channels.

A connection sequence, for example, as shown in FIG. 6, is utilized for receiving a incoming call from the external line 3 by the handset unit 1.

More specifically, when an incoming call arrives through the telephone network line 3, the associated ring tone signal is detected by the detecting circuit 234, whereupon a detection signal is generated and supplied to the microcomputer 240 in the base unit 2. The receiving circuit 220 is set to receive a vacant channel from among those indicated by the channel data CHDT stored in RAM 242, that is, either the up third channel or seventh channel. For example, if the third channel is vacant, the reception channel of the receiving circuit 220 is fixed to the up third channel. Further, the transmitting circuit 210 is permitted to transmit in the down third channel. As a result, the base unit 2 is set in the talk mode in the third channel.

The command signal CMND, whose control code CTRL indicates a request of the incoming call, is then repeatedly supplied from the microcomputer 240 to the transmitting circuit 210, so as to be converted into an FM signal Sd of down third channel and transmitted to the handset unit 1.

The signal Sd is received by the antenna 100 of the handset unit 1. Meanwhile, the receiving circuit 120 alternately and intermittently scans repeatedly the down third and seventh channels in accordance with the channel data CHDT stored in the RAM 142. However, when the reception channel becomes the third channel, the receiving circuit 120 senses the signal Sd and, as a result generates the detection signal SQLC. The scanning operation of the receiving circuit 120 is then stopped at the third channel, whereupon the receiving circuit 120 demodulates the FM signal Sd to provide the command signal CMDN. A determination is then performed on whether or not the identifying code SYID in this command signal CMND coincides with the identifying code SYID stored in the ROM 141.

In this case, since the identifying codes SYID are coincident with each other and the control code CTRL in the signal CMND indicates the request of the incoming call, the transmitting circuit 110 is permitted to transmit in the corresponding channel in which the FM signal Su is received, that is, the up third channel. Therefore, the handset unit 1 is also set in the talk mode in the third channel.

The command signal which answers the request of the incoming call is then supplied to the transmitting circuit 110 from the microcomputer 140, so as to be converted into the FM signal Su of the up third channel and transmitted to the base unit 2.

When the FM signal Su, which is transmitted from the handset unit 1 via the up third channel, is received by the base unit 2, the command signal CMND is generated by the receiving circuit 220 and supplied to the microcomputer 240.

Since the identifying code SYID in the command signal CMND is coincident with the identifying code SYID stored in the ROM 241 and the control code CTRL in the command signal CMND indicates the answer to the request of the incoming call, the transmitting circuit 210 and the receiving circuit 220 are now definitely in the talk mode in the third channel.

Accordingly, the handset unit 1 and the base unit 2 are connected via the third channel.

Further, in the handset unit 1, the oscillation circuit 138, which is controlled by the microcomputer 140, generates a ringer signal. This ringer signal is supplied to the speaker 139 so as to cause the speaker 139 to provide a bell sound, thus announcing the arrival of the incoming call.

If the talk key 132 in the handset unit 1 depressed so as to answer the incoming call, a command signal CMND for answering whose control code CRTL indicates the depression of the talk key 132 is generated. This command signal CMND is converted to the FM signal Su and transmitted in a manner as previously described. Further, the oscillation circuit 138 is turned OFF, thus turning off the ringer.

The transmitted signal Su from the handset unit 1 is received by the base unit 2 and demodulated to form the command signal CMND in a manner as previously described. As a result, the switch circuit 232 is placed in the off hook state.

Accordingly, a communication channel is opened between the handset unit 1 and the base unit 2, thus enabling telephone communication between the handset unit 1 and the outside phone.

When the user buys the above-mentioned cordless telephone, the channel data CHDT are not yet registered in the RAMs 142 and 242. Further, if the battery 151 is allowed to fully discharge, which may occur for example if the handset unit 1 is not placed in the standby mode after a telephone conversation has been finished or if the battery 151 is not recharged as required, the channel data CHDT which may have been registered or stored in the RAM 142 is lost. Further, the channel data CHDT stored in the RAM 242 of the base unit 2 may be lost by a power failure. As is to be appreciated, if the channel data CHDT are not registered in the handset unit 1 or in the base unit 2, the handset unit 1 and the base unit 2 cannot function properly.

Furthermore, even if the proper operation voltage is supplied to the handset unit 1 and the base unit 2 so as to make the same operable, in the standby mode, as previously described, the handset unit 1 monitors only two channels, for example, the third channel and seventh channel. As a result, when an incoming call arrives, the base unit 2 can effectively utilize only two of the 10 channels.

Thus, if the third and seventh channels are being utilized when an incoming call arrives and other channels are vacant, none of the vacant channels can be utilized and, as a result, the incoming call cannot be received. In other words, although 10 channels are available, only two channels can be utilized effectively.

One solution to the aforenoted problem would be to have the handset unit 1 and the base unit 2 arranged to repeatedly scan all down channels in the standby mode. However, as is to be appreciated, the duration of the sleep mode would then be reduced. Thus drawing more power from the battery 151 when in the standby mode.

A preferred solution is to automatically register the latest available channel data CHDT in the handset unit 1 and the base unit 2. Accordingly, the following situations would no longer present the aforenoted problems, that is, when the battery 151 of the handset unit 1 is fully discharged so that the battery 151 must be exchanged or recharged whereupon the handset unit 1 is again set in an operable state, when a power failure occurs in the power supplied to the base unit 2 and the power is subsequently restored so that the base unit 2 is again made operable, when the user purchases the cordless telephone and installs a new battery into the handset unit 1 or installs a recharged battery in the handset unit 1 and then the base unit 2 is powered, and when the handset unit 1 and the base unit 2 are actuated from a reset condition, such as when a telephone communication is ended after the handset unit 1 and the base unit 2 are powered by the supply of drive voltages and then they are placed in another communication mode.

An example in which the present cordless telephone is actuated from the reset condition will now be explained.

Figure 7A:
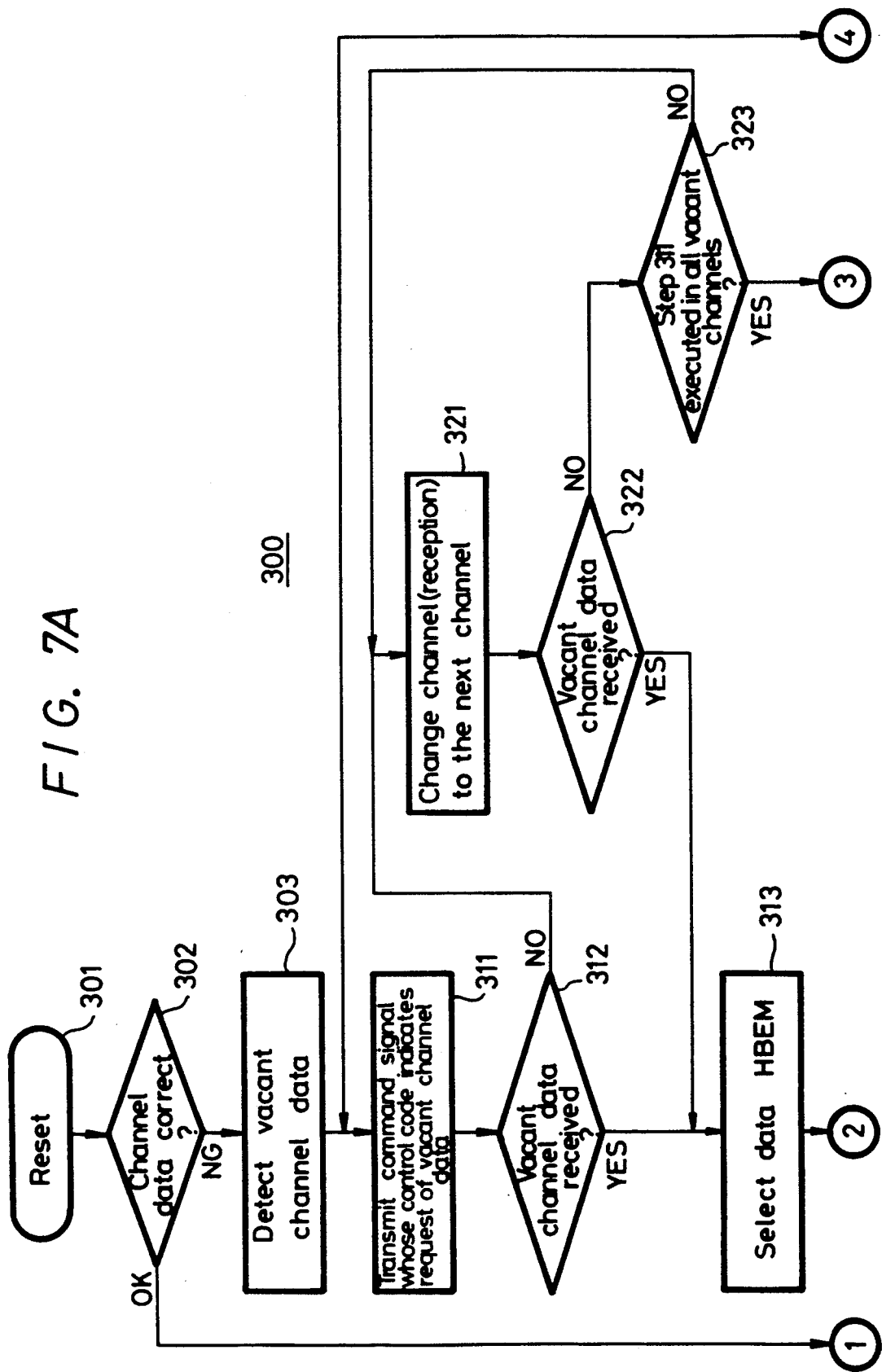
FIGS. 7A and 7B are a flowchart to which reference will be made in explaining an operation of a handset unit when the handset unit is actuated from a reset condition.
Figure 7B:
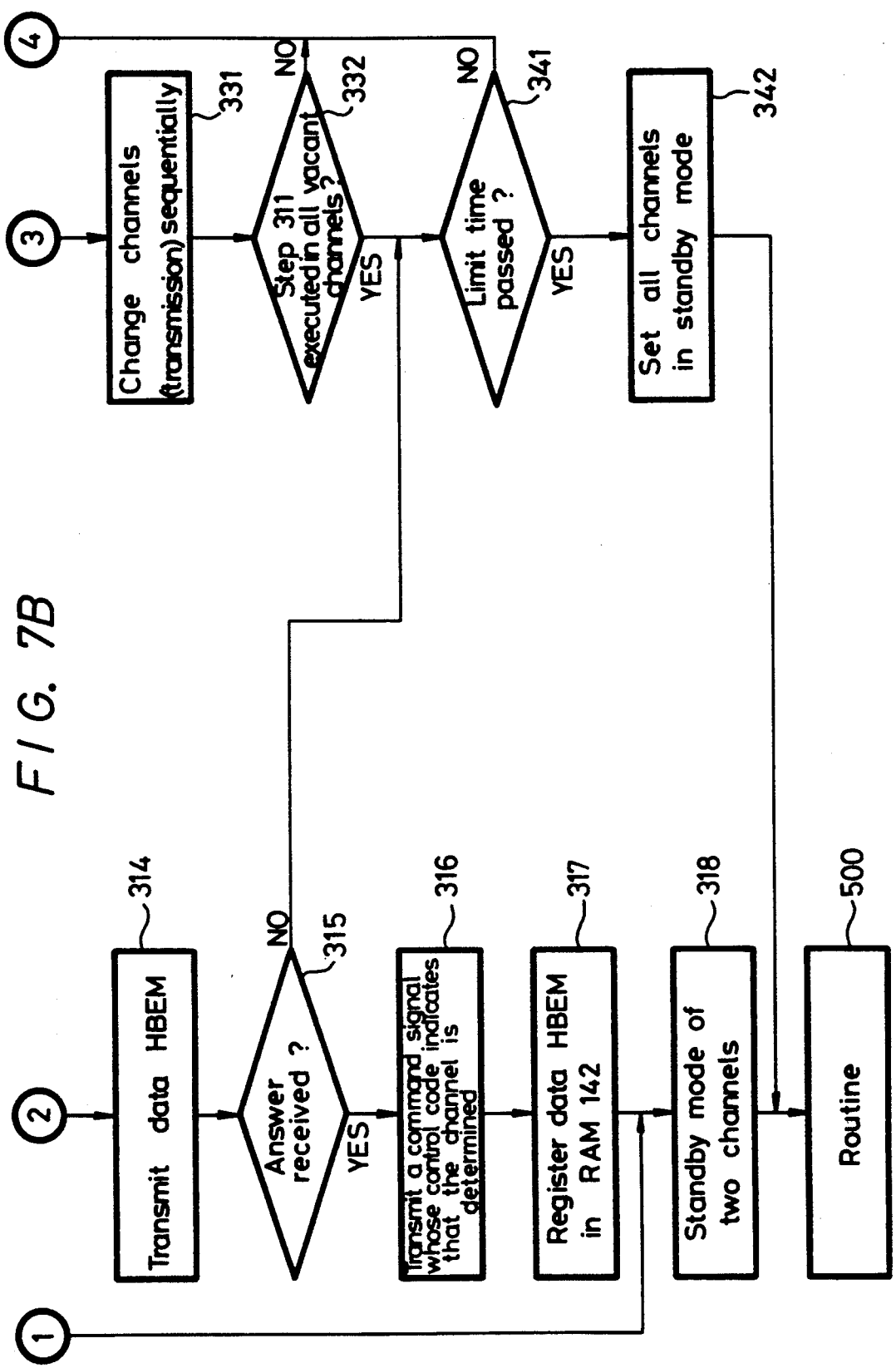
Figure 10:
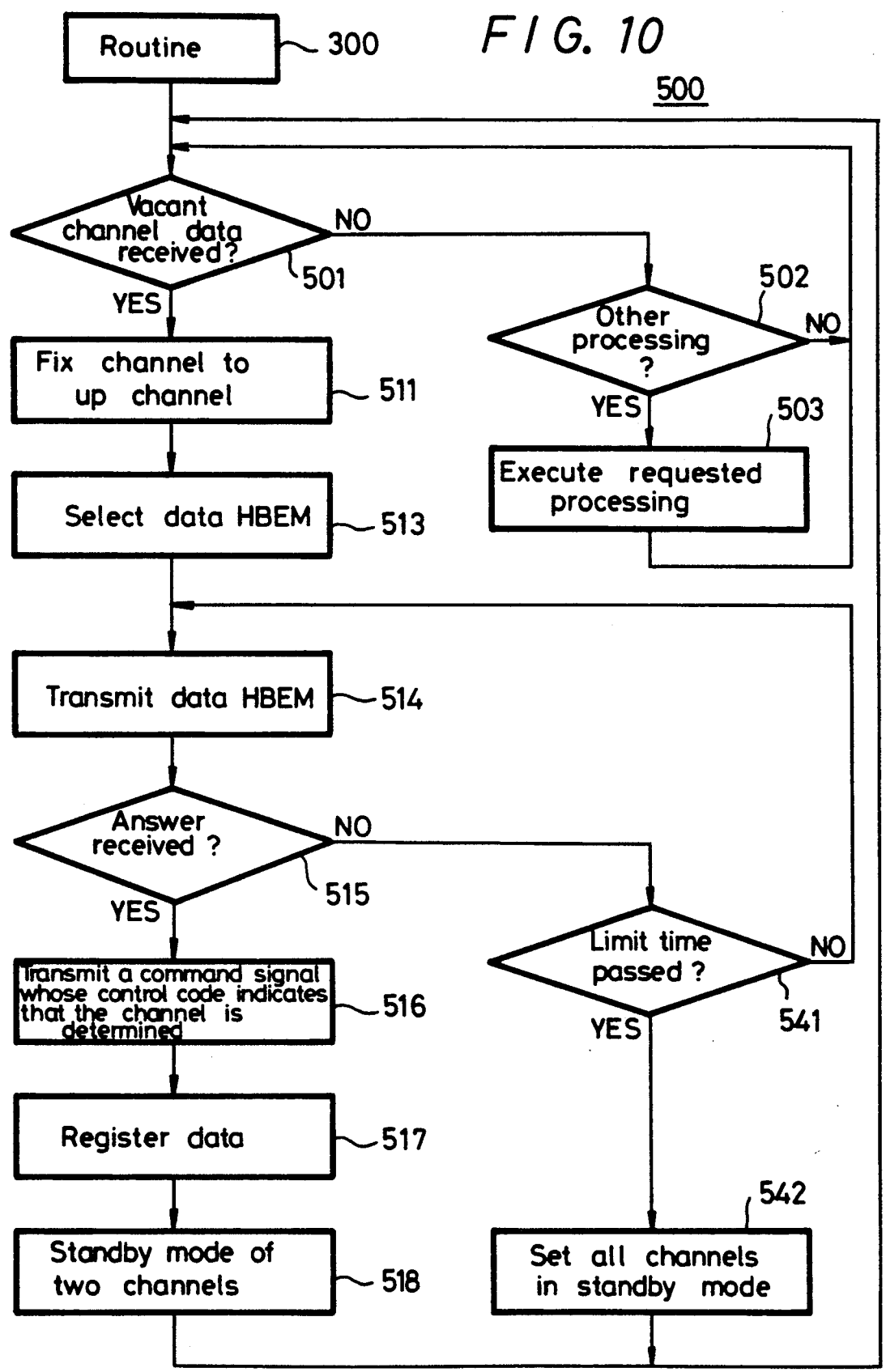
FIG. 10 is a flowchart to which reference will be made in explaining an operation of the handset unit when the handset unit is operated in a normal condition.
Figure 11:
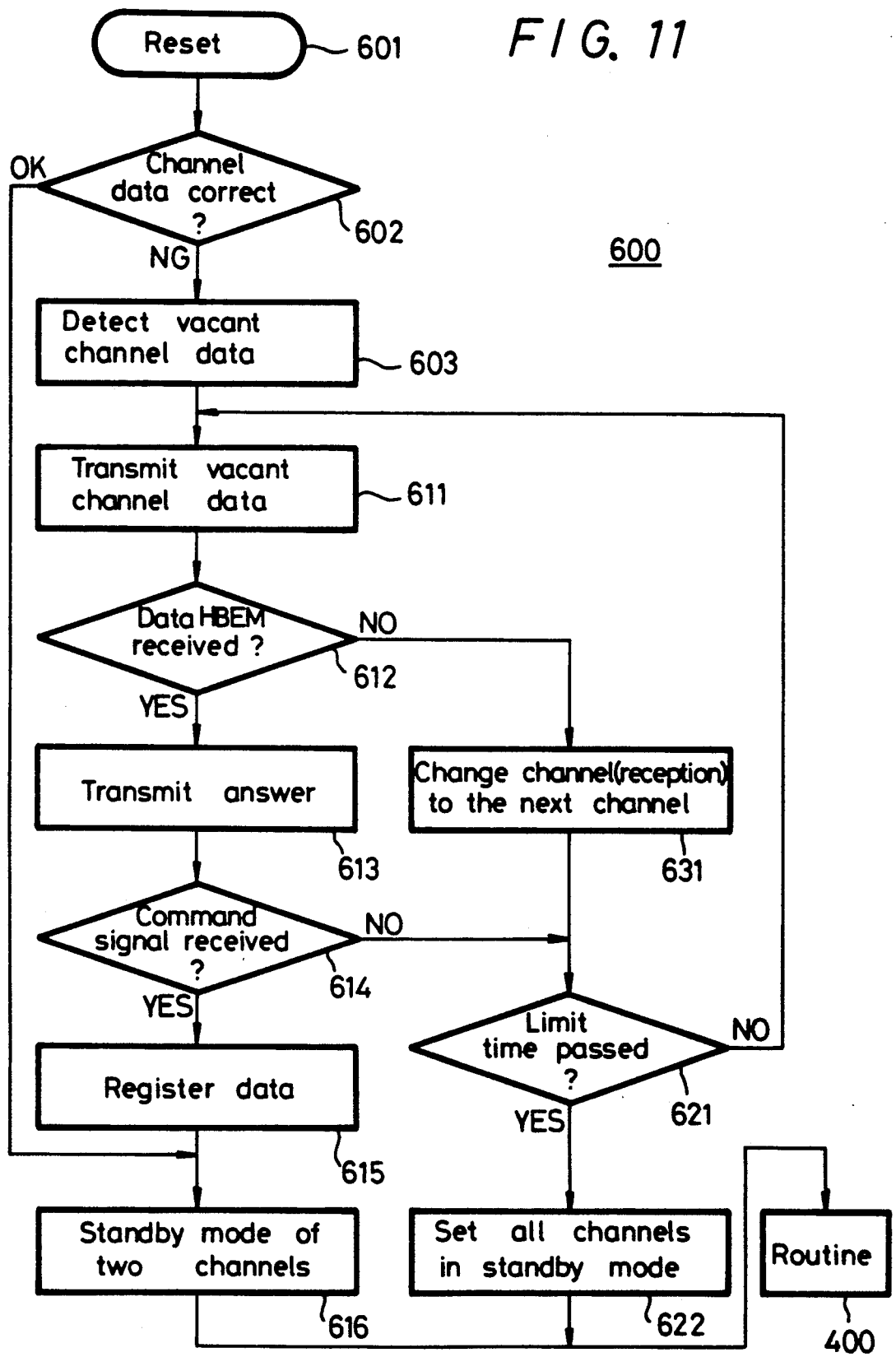
FIG. 11 is a flowchart to which reference will be made in explaining an operation of the base unit when the base unit is actuated from a reset condition.

Routines 300 and 500 shown in the flowcharts of FIGS. 7 and 10, respectively, are processed by the microcomputer 140, while routines 400 and 600 shown in the flowcharts of FIGS. 8 and 11, respectively, are processed by the microcomputer 240.

In addition to the respective registered addresses of the communication channel data CHDT, addresses for storing vacant channel data EMCH are also established in the RAMs 142 and 242.

If the handset unit 1 and the base unit 2 are supplied with predetermined voltages from respective predetermined power sources so that the handset unit 1 and the base unit 2 are in a proper operable condition, in the standby mode, all up channels are repeatedly scanned, received and then monitored in the base unit 2. At this time, all vacant channels which exist are registered in the RAM 242 as the vacant channel data EMCH which, in turn, are updated each time the channel is scanned.

An operation in which the handset unit 1 is actuated from the reset state and the base unit 2 is operating properly will now be described. In other words, this is the case in which the battery 151 of the handset unit 1 is exchanged (or recharged) after having been fully discharged.

Figure 9:
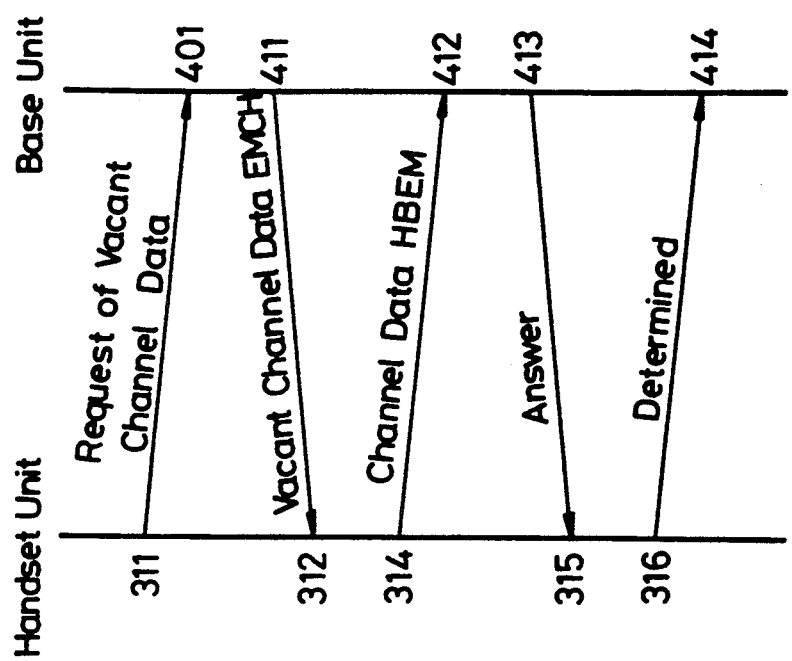
FIG. 9 is a diagram of a protocol used in the communication shown in FIGS. 7A, 7B and 8 between the handset unit and the base unit.

In this case, the routine 300 is executed in the handset unit 1 and the routine 400 is executed in the base unit 2 FIG. 9 shows a protocol associated with the routines 300 and 400 in which every operation is correctly performed. The reference numerals on the two sides of FIG. 9 identify the reference numerals of respective steps in the routines 300 and 400.

When the battery 151 is exchanged, the reset circuit 152 detects such exchange and generates a reset pulse which is supplied to the microcomputer 140, whereupon the processing performed by the microcomputer 140 is initiated at step 301 of the routine 300. In the next decision step 302, it is determined whether or not the channel data CHDT stored in the RAM 142 is correct. This checking operation may be performed by checking a check bit which was previously added to the channel data CHDT. If the checked result is abnormal, as represented by an NG in step 302, or if the channel data CHDT is lost, the routine proceeds from step 302 to step 303. In step 303, all down channels are sequentially received and monitored so as to detect vacant channels. All vacant channels detected are then registered in the RAM 142 as the vacant channel data EMCH. In the next step 311, one of the vacant channels detected in step 303 is utilized to transmit a command signal CMND whose control code CTRL indicates the request of the vacant channel data EMCH. This transmission of the command signal CMND is repeatedly carried out over a time period slightly longer than the period of one scanning cycle of the base unit 2 that is, approximately 1.24 seconds.

The processing of the microcomputer 140 then proceeds from step 311 to the next decision step 312.

On the other hand, since the base unit 2 is set in the normal standby mode, several predetermined steps of the routine 400 are repeated.

More specifically, as shown in FIG. 8, it is determined in step 401 by the microcomputer 240 whether or not the handset unit 1 requested the vacant channel data EMCH at step of 311 of FIG. 7. If the handset unit 1 did not yet request the vacant channel data EMCH, as represented by a NO at step 401, then the processing proceeds to the next decision step 402. In step 402, it is determined whether or not other processing is requested. If no other processing is requested, the processing returns from step 402 to step 401. If on the other hand, other processing is requested, as represented by a YES at step 402, the processing proceeds from step 402 to step 403. At step 403, the requested processing is executed and the processing then returns to step 401.

Accordingly, in the normal standby mode condition of the base unit 2, steps 401, 402 (and step 403) are repeated.

However, if the command signal CMND which requests the vacant channel data EMCH is transmitted at step 311, then since the duration of this transmission is longer than one scanning cycle of the base unit 2 as previously described, this transmission is detected by the base unit as indicated by a YES in step 401. The processing then proceeds from step 401 to step 411. In step 411, the reception channel of the base unit i is fixed to the up channel in which the command signal CMND is received and the transmission channel of the base unit is fixed to the down channel which corresponds with the up channel, and a command signal CMND whose control code CTRL indicates the transmission of the vacant channel data EMCH and the vacant channel data EMCH stored in the RAM 242 is generated. This signal CMND is transmitted to the handset unit 1 and the processing proceeds to step 412.

Since the handset unit 1 is still set to the same channel the command signal CMND of the step 411 is received and detected at step 312, and, as a result, the processing proceeds from step 312 to step 313. In step 313, the vacant channel data EMCH obtained at step 303 and the vacant channel data EMCH transmitted from step 411 are compared with each other and the data HBEM, which indicates common vacant channels in both groups of data EMCH, are generated.

In this case, as will be more fully described later, two channels from among the channels indicated by the data HBEM, are registered in the RAMs 142 and 242 as channel data CHDT. When the data HBEM does not include two channels, the channel which becomes vacant in the base unit 2 is employed as the data HBEM. If a channel is not so obtained, the present channel and the channel next to the present channel are employed as the data HBEM.

The relationship between the channel numbers and the respective channel frequencies of the cordless telephone used in the United States of America is illustrated in FIG. 12. As is to be appreciated, the frequency intervals between channels are not constant. As a result, when any one of the following combinations of channels exist, that is, the second and third channels, the second and sixth channels, the third and fifth channels and the fifth and seventh channels, there is a relatively large possibility that if one of the channels is disturbed by another cordless telephone, such that radio interference or the like occurs, the other channel will also be simultaneously disturbed. For example, when the second and third channels are present, if the second channel is disturbed, then the third channel tends to be disturbed simultaneously (when the intermediate frequency is 10.695 MHz).

For this reason, the above combinations of channels are excluded from the data HBEM.

In the next step 314, the command signal CMND whose control code CTRL indicates the transmission of the channel data HBCM and the data HBEM obtained at step 313 is generated. This signal CMND is transmitted to the base unit 2, and the processing proceeds to decision step 315.

This command signal CMND is received and detected by the base unit 2 at step 412 and, as a result, the processing proceeds to the next step 413. In step 413, a corresponding answer is transmitted to the handset unit 1 through a command signal CMND whose control code CTRL indicates the reception of the data HBEM, whereupon the processing proceeds to step 414.

If the above command signal CMND with control code CTRL is detected by the handset unit 1 at decision step 315, then the processing proceeds from step 315 to step 316. In step 316, a command signal CMND, whose control code CTRL indicates that a channel is determined, is transmitted to the base unit 2, and the processing proceeds to step 317. In step 317, the data HBEM is registered in the RAM 142 as the channel data CHDT and the processing proceeds to step 318.

In step 318, the standby mode in which the two channels indicated by the channel data CHDT are alternately and intermittently received and monitored, as previously explained with reference to FIG. 1, is set. As a result, when the handset unit 1 is connected to the base unit 2 so as to call an outside party or the like, the outgoing call is made utilizing an arbitrary vacant channel. In the following processing, the base unit 2 is placed in the standby mode in which the two channels are intermittently received.

Further, in the base unit 2, the command signal CMND with control code CTRL transmitted by the handset unit 1 at step 316 is received and detected at step 414, and the processing proceeds from step 414 to step 415. In step 415, the data HBEM is registered in the RAM 242 as the channel data CHDT.

In the next step 416, the standby mode in which all channels are repeatedly scanned, received and monitored, as previously explained with reference to FIG. 1, is set. As a result, when the base unit 2 is connected to the handset unit 1 when an incoming call arrives, the resultant telephone conversation is made via one of the two channels indicated by the channel data CHDT. Then, the processing returns to step 401 in which the base unit 2 is placed in the standby mode.

Accordingly, the handset unit 1 and the base unit 2 are both placed in the standby mode.

On the other hand, in step 311, the channel utilized by the handset unit 1 to transmit the command signal CMND whose control code CTRL requests the vacant channel data EMCH may be occupied in the base unit 2 by another cordless telephone. More specifically, it is frequently observed that while the channel used to transmit the command signal CMND is vacant in the handset unit 1, such channel may be occupied in the base unit 2.

In this case, the transmission of the command signal CMND is step 411 by the base unit 2, is not performed so that the handset unit 1 does not receive this command signal CMND. Consequently, the processing proceeds from step 312 to step 321.

Step 321 and the following steps 322 and 323 are particularly useful when the handset unit 1 and the base unit 2 are both started from reset conditions, while being less useful when only the handset unit 1 is started from the reset condition, as will be more fully described later. At this time, the processing proceeds from step 321 to step 331 through steps 322 and 323.

In step 331, the transmission channel of the handset unit 1 is changed to the next vacant channel on the basis of the vacant channel data EMCH stored in the RAM 142. In the next decision step 332, it is determined whether or not the step 311 is executed in all vacant channels indicated by the vacant channel data EMCH. If the step 311 is not yet executed in all vacant channels, as represented by a NO at step 332, then the processing returns from step 332 to step 311.

Therefore, even when the command signal CMND which requests the vacant channel data EMCH is transmitted in step 311, if the command signal CMND of the data EMCH is not returned in step 411, the loop formed of steps 311, 312, 321, 322, 323, 331, 332 and 311, in that order, is repeated until the command signal CMND is returned or until all of the vacant channels are utilized, as described hereinafter. During this time, the channels are sequentially changed at step 331.

If the above-mentioned command signal CMND of step 411 is returned in a vacant channel, this command signal CMND is detected in step 312, whereupon the processing proceeds from step 312 to step 313 and so forth, as previously described.

If the step 311 is executed in all vacant channels indicated by the vacant channel data EMCH stored in the RAM 142, the processing proceeds from step 332 to decision step 341. It is determined in step 341 whether or not a predetermined limit time, for example, 25 seconds, have passed since the step 311 was executed for the first time. This limit time corresponds to approximately twice the time necessary for sequentially receiving and monitoring the first channel to the tenth channel one by one, as in steps 321 and 323, that is, 10 channels $\times$ 1.2 seconds $\times$ 2.

If the predetermined limit time has not passed as represented by a NO at step 341, then the processing returns from step 341 to step 311, and the step 311 and the following steps are executed as described above.

However, if the predetermined limit time has passed, as represented by a YES at step 341, the processing proceeds from step 341 to step 342. In step 342, the standby mode is set in the handset unit 1 such that all channels are scanned, received and monitored and the handset unit 1 is set in a sleep mode of, for example, about 2.54 seconds each time a scanning cycle is completed. As a result, when the handset unit 1 is connected to the base unit 2 so as to call an outside party, the telephone conversation is made via an arbitrary vacant channel. Thus, the handset unit 1 is placed in the standby mode in which all channels are received intermittently.

Accordingly, in this case, the handset unit 1 receives and monitors all channels in the standby mode.

In this case, the period of a cycle in which an arbitrary channel is received and monitored one more time after that channel has been received and monitored is approximately equal to 3.74 seconds (that is, 120 milliseconds $\times$ 10 channels + 2.5 seconds). This period is equal to the period of the standby mode in which two channels are intermittently received and monitored, that is, 120 milliseconds $\times$ 2 channels + 3.5 seconds = 3.74 seconds. Accordingly, when an incoming signal is received, by the base unit 2 the average time necessary for connecting the base unit 2 and the handset unit 1 is equal regardless of which of the above described standby modes is utilized, however, the duration of the sleep period is reduced from 3.5 seconds to 2.54 seconds as previously described.

Further, if the command signal CMND returned by the base unit 2 in step 413 is not received by the handset unit 1 at step 315, as represented by a NO, then the processing returns to step 311 from step 315 through step 341. Thus, the processing beginning at step 311 is again executed.

If it is determined in step 302 that the channel data CHDT stored in the RAM 142 is not abnormal when the channel data CHDT is checked, as indicated by an OK at step 302, the processing proceeds from step 302 to step 318, wherein the handset unit 1 is placed in the original standby mode in which the two channels are intermittently received.

Further, if the command signal CMND is not received by the base unit 2 in step 412, then the processing proceeds from step 412 to decision step 421. In decision step 421, it is determined whether or not a predetermined limit time, for example, 41 seconds, have passed since the step 411 was executed for the first time. If the predetermined limit time has not passed, as represented by a NO at step 421, then the processing returns from step 421 to step 411, and the step 411 and the following steps are executed as described above.

If the predetermined limit time has passed, as represented by a YES at step 421, then the processing proceeds from step 421 to step 422. In step 422, the standby mode for the base unit 2 is set wherein all channels are scanned, received and monitored. As a result, when the base unit 2 is connected to the handset unit 1 so as to receive an incoming call or the like, this connection is carried out through a desired vacant channel. The processing then returns to step 401 from step 422 and the base unit 2 is set in the standby mode set in step 422.

Further, when the command signal CMND transmitted by the handset unit 1 in step 316 is not received by the base unit 2 in step 414, as indicated by a NO, the processing returns to step 421, whereupon processing continues as described above.

An operation in which the handset unit 1 is in a normal condition and the base unit 2 is actuated from the reset condition will be described below. This operation is performed when power is restored after a power failure occurred in the power source of the base unit 2

Figure 13:
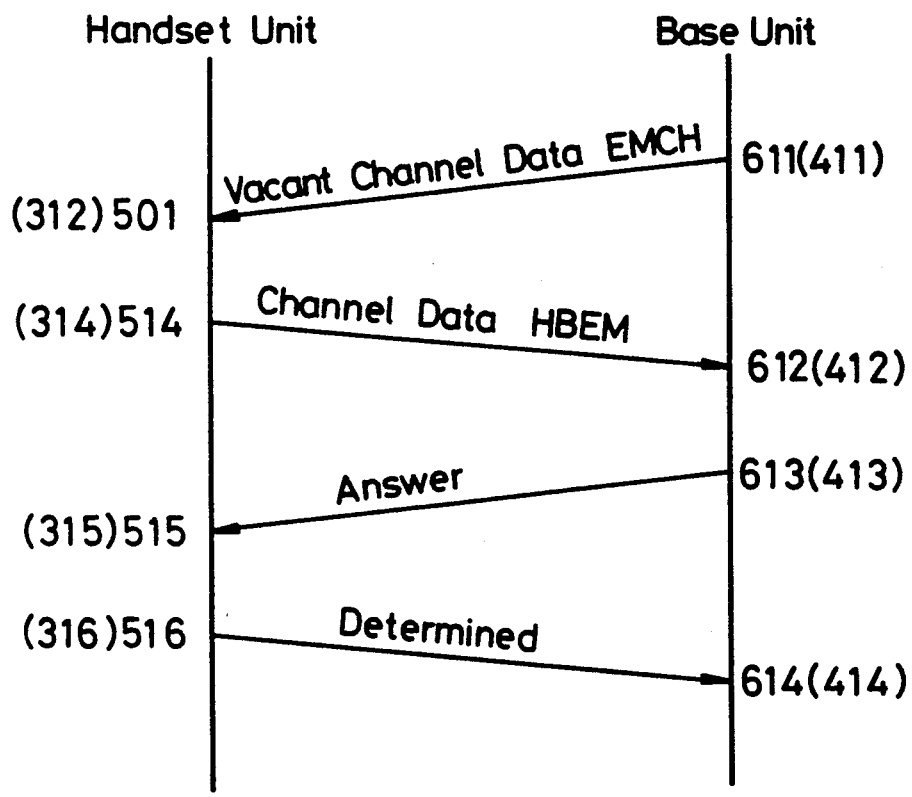
FIG. 13 is a diagram of a protocol used in a communication between the handset unit and the base unit.

In this case, a routine 500 shown in FIG. 10 is executed in the handset unit 1 and a routine 600 shown in FIG. 11 is executed in the base unit 2. FIG. 13 shows a protocol associated with the routines 500 and 600 in which the operations are performed normally. The reference numerals in the two sides of FIG. 13 identify the steps in the routines 500 and 600, and the reference numerals in parenthesis identify those corresponding steps in the routines 300 and 400, respectively.

More specifically, when power is restored after a power failure, the reset circuit 252 detects such power and generates a reset pulse which is supplied to the microcomputer 240. The processing performed by the microcomputer 240 is initiated at step 601 of the routine 600. In the next decision step 602, it is determined whether or not the channel data CHDT stored in the RAM 242 is normal or correct.

If the checked result indicates that the channel data CHDT is abnormal, as represented by an NG at step 602, or if the data CHDT is lost, then the processing proceeds from step 602 to step 603. In step 603, all up channels are sequentially received and monitored so as to detect vacant channels. All vacant channels detected are registered in the RAM 242 as vacant channel data EMCH. In the next step 611, which is similar to step 411, a command signal CMND whose control code CTRL indicates the transmission of the vacant channel data and the vacant channel data EMCH is transmitted by utilizing one of the detected vacant channels. The transmission of the command signal CMND is repeatedly carried out over a time period slightly longer than the period of one cycle in which the reception and monitoring of the handset unit 1 is completed, that is, approximately 4.04 seconds.

The processing then proceeds from step 611 to the next decision step 612.

On the other hand, since the handset unit 1 is in the normal standby mode, steps 501 and 502 in the routine 500 are repeated.

More specifically, it is determined in step 501 whether or not the base unit 2 transmitted the vacant channel data EMCH in step 611. If the transmission of the vacant channel data EMCH is not performed or received, as represented by a NO at step 501, the processing proceeds to the next decision step 502 whereat it is determined whether or not other processing is requested. If other processing is not requested, as represented by a NO at step 502, the processing returns from step 502 to step 501. If other processing is requested, as represented by a YES at step 502, then the processing proceeds from step 502 to step 503 whereat the requested processing is performed. Thereafter, the processing returns to step 501.

Thus, in the normal standby mode condition of the handset unit 1, steps 501, 502 (and step 503) are repeated.

However, if the command signal CMND of the vacant channel data EMCH is transmitted at step 611, then since the duration of this transmission is longer than the duration of one cycle during which the reception and monitoring of the handset unit 1 is completed, this transmission is detected by the handset unit at step 501, and the processing then proceeds from step 501 to step 511. In step 511, the channel is fixed to the up channel through which the command signal CMND is received and to a down channel which corresponds with the above up channel.

The processing performed in steps 513 to 518 is similar to that of steps 313 to 318 and the processing performed in steps 612 to 616 is similar to that of steps 412 to 416 and, as a result, a description of the processing performed therein will not be repeated.

Accordingly, in step 518, the handset unit 1 is set in the standby mode wherein the handset unit 1 alternately and intermittently receives the two channels indicated by the channel data CHDT. As a result, to place an outgoing call, the handset unit 1 is connected to the base unit 2 in a desired vacant channel.

The processing then returns from step 518 to step 501 with the handset unit 1 placed in the standby mode for intermittently receiving the two channels.

Further, in step 616, the base unit 2 is set in the standby mode in which all channels are repeatedly scanned, received and monitored. As a result, when the base unit 2 is connected to the handset unit 1 so as to receive an incoming call, the base unit 2 uses one of the two channels indicated by the channel data CHDT. Then, the base unit 2 is placed in the standby mode as previously described.

Accordingly, the handset unit 1 and the base unit 2 are both placed in the standby mode.

Further, if the command signal CMND transmitted from the base unit 2 in step 613 is not received by the handset unit 1, as represented by a NO at step 515, the processing proceeds from step 515 to step 541. In step 541, which is similar to step 341, it is determined whether or not a predetermined limit time, for example, 25 seconds, have passed since step 514 was executed for the first time. If the predetermined limit time has not passed yet, as represented by a NO at step 541, then the processing returns from step 541 to step 514, and step 514 and the following steps are repeated.

However, if the predetermined limit time has passed, as represented by a YES at step 541, then the processing proceeds from step 541 to step 542. In step 542, which is similar to step 342, the standby mode is set in the handset unit 1 such that the handset unit 1 scans, receives and monitors all channels and is set in the sleep mode of, for example, about 2.54 seconds each time one scanning cycle is completed. As a result, when the handset unit 1 is connected to the base unit 2 for outgoing call or the like, the handset unit 1 is connected to the base unit 2 via an arbitrary vacant channel.

The processing then returns from step 542 to step 501, with the handset unit 1 placed in the standby mode for receiving all channels intermittently.

Further, if the command signal CMND of the data HBEM is not received by the base unit 2, at step 612, as represented by a NO, then the processing proceeds from step 612 to step 631. In step 631, the channel through which the transmission and reception are respectively carried out at steps 611 and 612 is changed to the next vacant channel, and the processing proceeds to step 621.

In step 621, which is similar to step 421, it is determined whether or not a predetermined limit time, for example, 41 seconds, have passed since step 611 was executed for the first time. If the predetermined limit time has not passed, as represented by a NO at step 621, then the processing returns from step 621 to step 611 and step 611 and the following steps are executed.

On the other hand, if the predetermined limit time has passed, as represented by a YES at step 621, then the processing proceeds to step 622. In step 622, the base unit 2 is set in the standby mode in which all channels are scanned, received and monitored. As a result, when an incoming call or the like arrives, the base unit 2 is connected to the handset unit 1 via an arbitrary vacant channel. The base unit 2 is thus in the standby mode set in step 622 as processing continues.

Further, if the command signal CMND transmitted from the handset unit 1 in step 516 is not received by the base unit 2, as represented by a NO at step 614, then the processing returns to step 621, whereupon processing continues as described above.

It is it determined in step 602 that the channel data CHDT is not abnormal as a result of checking the channel data CHDT of the RAM 242, as indicated by an OK at step 602, then the processing proceeds from step 602 to step 616, wherein the base unit 2 is placed in the standby mode of the original two channels.

An operation in which the handset unit 1 and the base unit 2 are both actuated from the reset condition will be explained below.

This operation is performed when the cordless telephone is bought by a user and used for the first time. In this case, the routine 300 is executed by the handset unit 1 and the routine 600 is executed by the base unit 2.

In this case, the processing in the base unit 2 begins with step 601 and proceeds to step 611 through steps 602 and 603. Thereafter, until the base unit 2 receives the data HBEM from the handset unit 1 in step 612 or until the predetermined limit time, that is, 41 seconds, have passed in step 621, the loop formed of steps 611, 612, 631, 621 and 611, in that order, is repeated. Each time one cycle of this loop is completed, the channel is changed to the next vacant channel in step 631.

On the other hand, the processing in the handset unit 1 begins with step 301 and proceeds to step 311 through steps 302 and 303. In the next decision step 312, it is determined whether or not the command signal CMND of the vacant channel data EMCH is received. At that time, although the base unit 2 repeats the loop formed of steps 611, 612, 631, 621 and 611 so as to transmit the command signal CMND of the data EMCH, the transmission channel is generally not coincident with the reception channel of step 312.

Consequently, the processing in the handset unit 1 generally proceeds from step 312 to step 321, whereupon the reception channel of the receiving circuit 120 of the handset unit 1 is changed to the next channel. In the next decision step 322, it is determined whether or not the command signal CMND of the data EMCH transmitted by the base unit 2 in step 611 is received. If the command signal CMND is received at step 322, as represented by a YES, the processing proceeds from step 322 to step 313. Thereafter, step 313 and the following steps are executed as previously described, such that the handset unit 1 is placed in the standby mode of step 318 or 342.

Since step 313 and the following steps are executed in the handset unit 1 as described above, the processing in the base unit 2 leaves the loop formed of steps 611, 612, 631, 621 and 611 via step 612 and proceeds to step 613. Subsequently, the base unit 2 is placed in the standby mode of step 616 or 622.

Further, if the command signal CMND of the data EMCH transmitted in step 611 is not received by the handset unit 1 in step 322, as represented by a NO at step 322, then the processing proceeds from step 322 to step 323. In step 323, it is determined whether or not the checking of the reception channels in step 321 is performed for all channels. If not, the processing returns from step 323 to step 321.

If, on the other hand, the checking of the reception channels in step 321 is carried out for all vacant channels, as indicated by a YES in step 323, the processing proceeds from step 323 to step 331 and continues thereafter as previously described.

Accordingly, in the base unit 2, the command signal CMND of the vacant channel data EMCH is repeatedly transmitted in all vacant channels via the loop formed of steps 611, 612, 631, 621 and 611, while the handset unit 1 repeatedly receives all the vacant channels in an attempt to receive the command signal CMND of the vacant channel data EMCH transmitted in step 611 via the loop formed of steps 312, 321, 322, 323 and 321. Therefore, as is to be appreciated, the channel of the handset unit 1 and the channel of the base unit 2 may eventually become coincident with each other. If they become coincident with each other, the processing in the handset unit 1 proceeds from step 312 or 322 to step 313, and the processing of the base unit 2 proceeds from step 612 to step 613. Thereafter, the processing continues as described above such that, provided the predetermined limit time has not passed, the handset unit 1 and the base unit 2 are respectively placed in the standby mode of steps 318 and 616 for intermittently receiving two channels.

If, however, the predetermined limit time has passed during the loop formed of steps 611, 612, 631, 621 and 611 or the loop formed of steps 312, 321, 322, 323, 331, 332 and 311, the handset unit 1 or the base unit 2 is placed in the standby mode of step 342 or 622, respectively, so as to intermittently receive all channels.

The limit time of 41 seconds in step 621 is 10 times the transmission period in step 611 so as to allow step 611 to be executed in all the vacant channels, even when all of the channels are vacant.

Alternatively, the handset unit 1 or the base unit 2 may be provided with a reset switch, thus forcing the handset unit 1 or the base unit 2 to execute the routine 300 or 600, respectively.

Figure 14A:
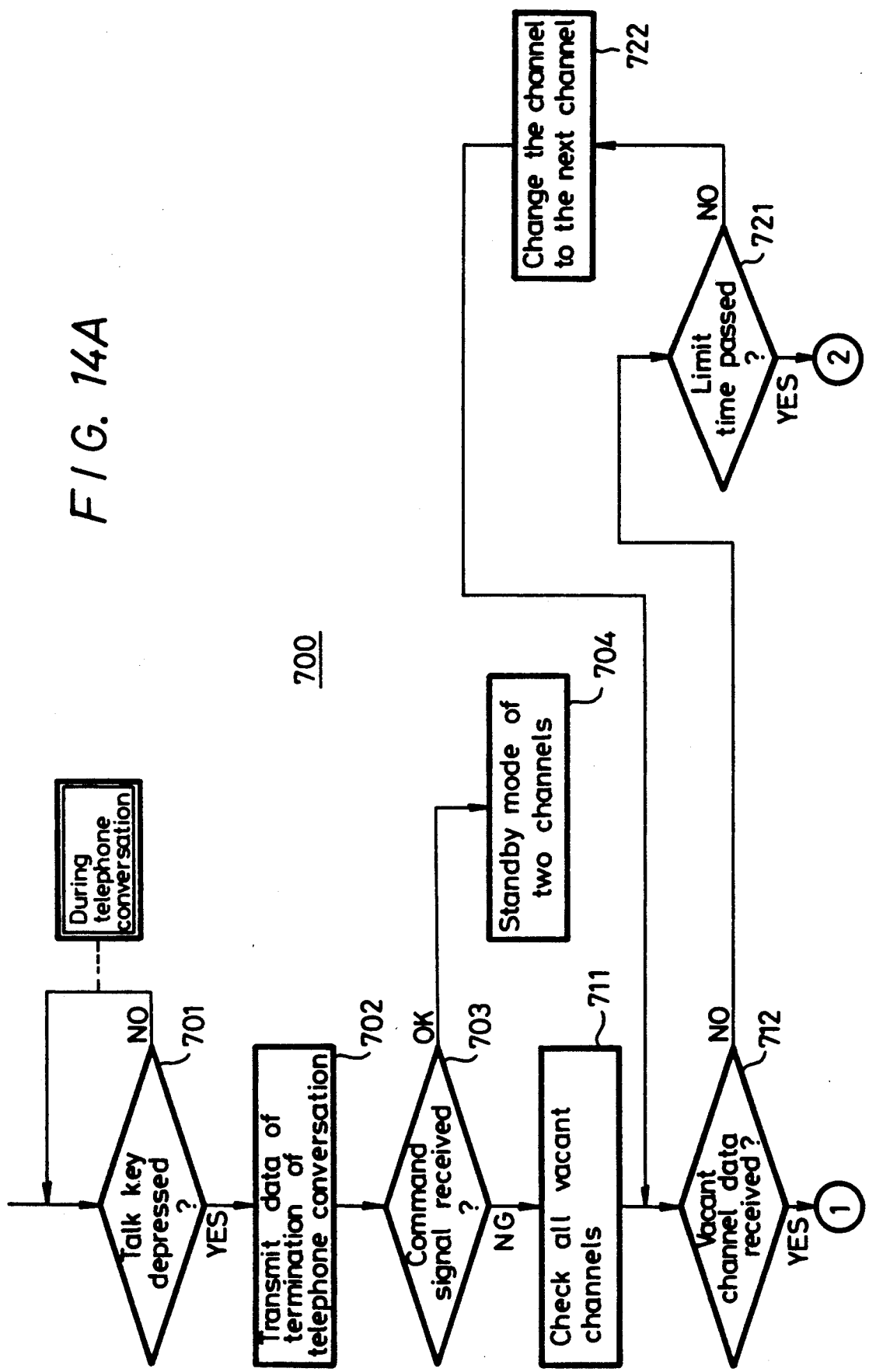
FIGS. 14A and 14B are a flowchart to which reference will be made in explaining an operation of the handset unit.
Figure 14B:
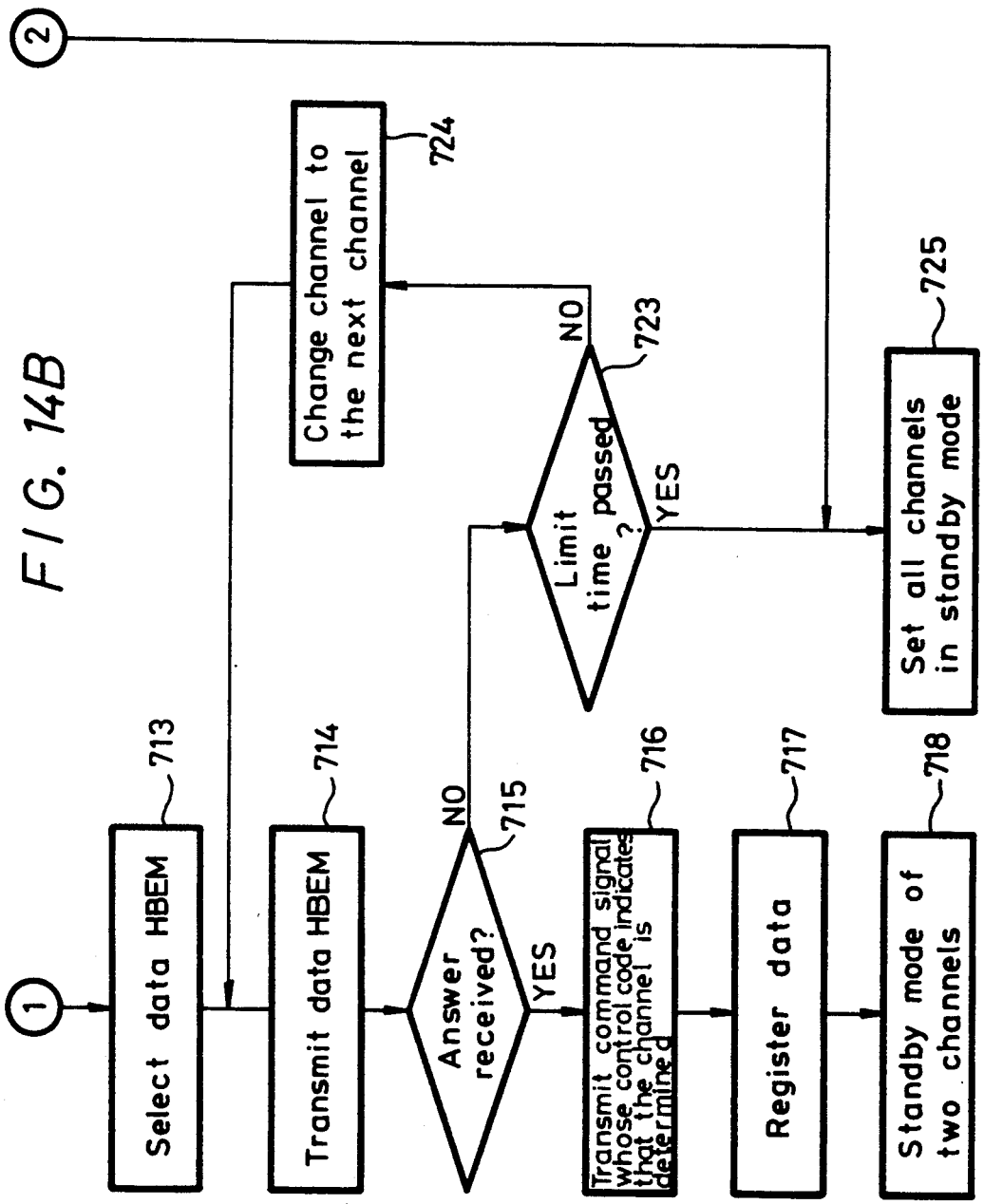
Figure 15:
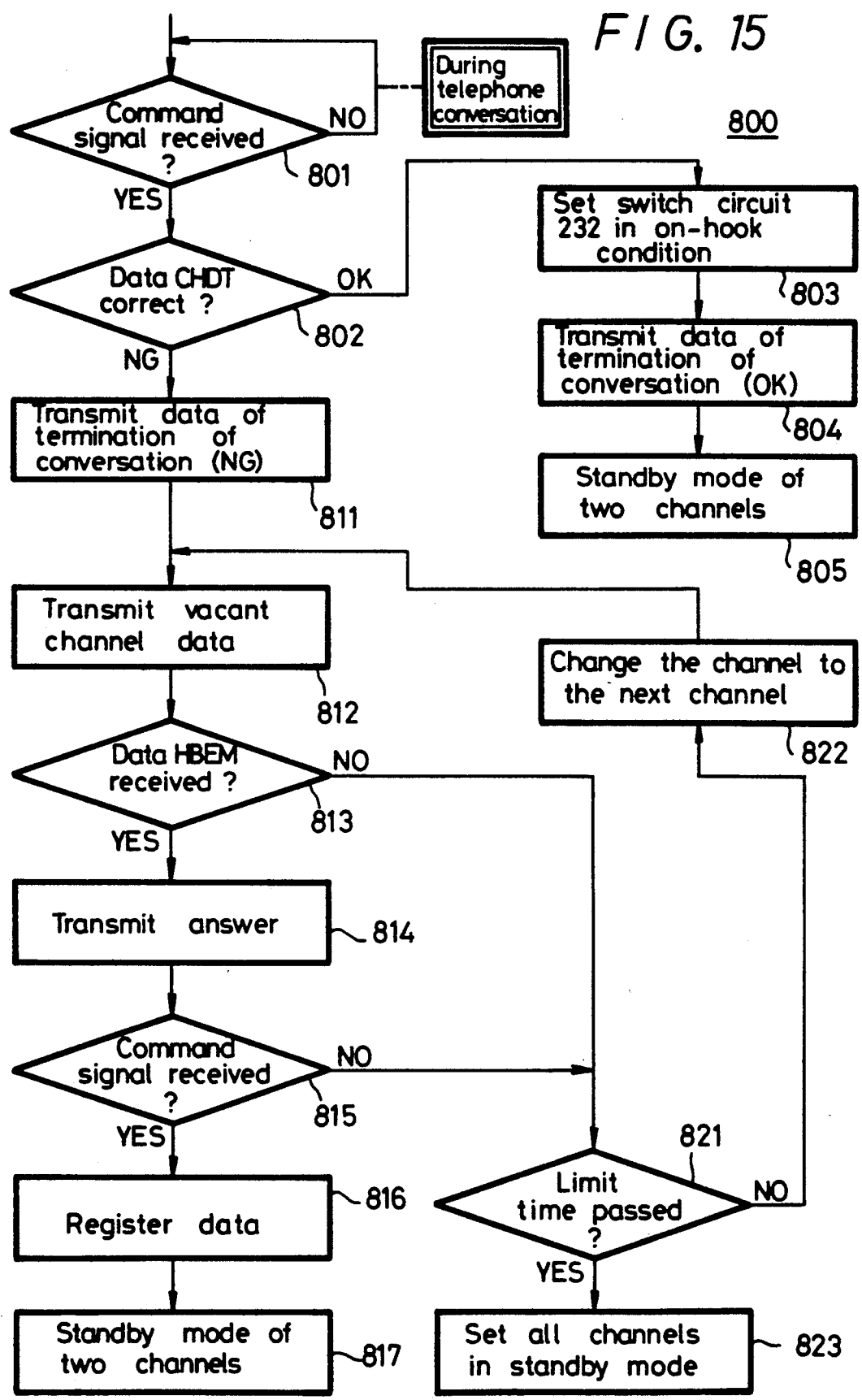
FIG. 15 is a flowchart to which reference will be made in explaining an operation of the base unit.

In order that proper updated channel data may be automatically registered when a telephone communication is ended, a routine 700 illustrated in the flowchart of FIG. 14 is prepared in the microcomputer 140 of the handset unit 1 and a routine 800 illustrated in the flowchart of FIG. 15 is prepared in the microcomputer 240 of the base unit 2.

Assume now that the handset unit 1 and the base unit 2 are each in a normal operating condition. As a result, in the standby mode of the base unit 2, all up channels are repeatedly scanned, received and monitored. At this time, all vacant channels are registered in the RAM 242 as vacant channel data EMCH. The data EMCH stored in the RAM 242 is updated each time the channel is scanned, as previously described.

Figure 16:
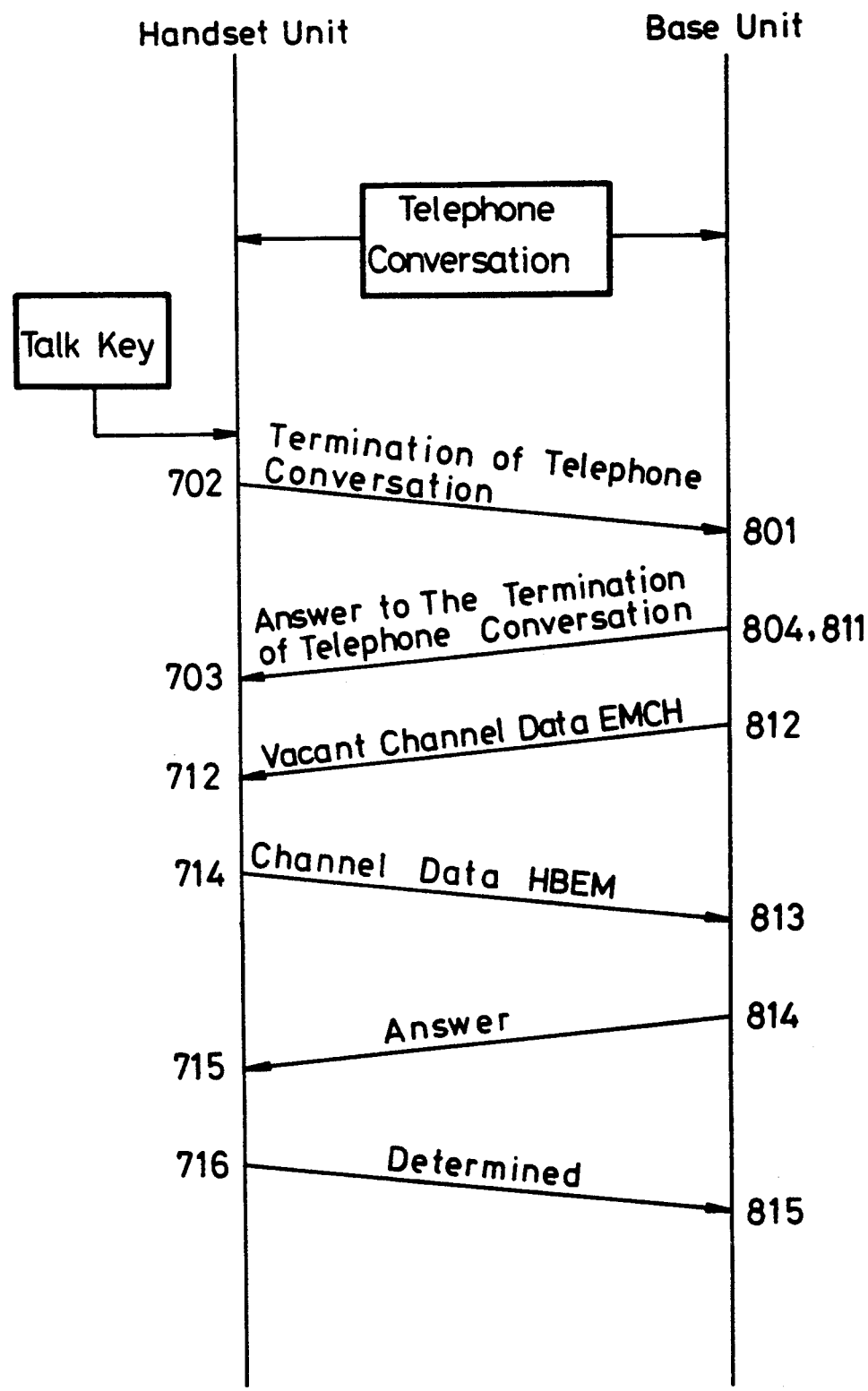
FIG. 16 is a diagram of a protocol used in a communication between the handset unit and the base unit when the channel data are updated normally.

When the telephone communication is completed, the routines 700 and 800 are respectively executed by the microcomputers 140 and 240, so as to update the channel data CHDT stored in the RAMs 142 and 242. FIG. 16 shows a protocol associated with the routines 700 and 800 in which the channel data CHDT is updated correctly. The reference numerals on the two sides of FIG. 16 correspond with the respective reference numerals of the steps in the routines 700 and 800.

More specifically, during the telephone conversation, the handset unit 1 and the base unit 2 are coupled together via a communication channel and the base unit 2 is connected to the telephone network line 3.

During this telephone communication, it is determined in step 701 by the microcomputer 140 whether or not the talk key 132 of the handset unit 1 is depressed. If the talk key 132 of the handset unit 1 is not depressed, as represented by a NO at step 701, the processing of the microcomputer 140 repeats step 701. Therefore, during the telephone conversation, the condition of the talk key 132 is continuously checked.

In the base unit 2, it is determined by the microcomputer 240 in step 801 whether or not a command signal CMND indicating the termination of the telephone conversation from the handset unit 1 was received. If this command signal CMND was not received, as represented by a NO at step 801, the processing of the microcomputer 240 repeats step 801. Therefore, during the telephone conversation, continuous checking is performed for the reception of the command signal CMND for terminating the telephone communication.

When the telephone conversation is finished and the talk key 132 is depressed, such depression of the talk key 132 is detected in step 701 as indicated by the YES, whereupon the processing proceeds from step 701 to step 702. In step 702, a command signal CMND whose control code CTRL indicates the termination of the telephone conversation is transmitted to the base unit 2, and the processing proceeds to step 703.

In the base unit 2, this command signal CMND is detected at step 801, as indicated by the YES, whereupon the processing proceeds from step 801 to step 802. In step 802, it is determined whether or not the channel data CHDT stored in the RAM 242 is correct by checking the corresponding detecting signal SQLC.

If the checked result in normal, or if the channel indicated by the channel data CHDT is vacant, as represented by an OK at step 802, then the processing proceeds from step 802 to step 803. In step 803, the switch circuit 232 is set in the on hook condition, and the processing continues to the next step 804. In step 804, a command signal whose control code CTRL indicates an answer to the termination of the telephone conversation and that the channel data CHDT is normal is generated and transmitted to the handset unit 1.

In step 703, the command signal CMND of step 804 is received and checked by the handset unit 1. Since the command signal CMND indicates the answer to the termination of the telephone conversation and that the channel data CHDT of the base unit 2 is normal, the processing proceeds, as indicated by the OK, from step 703 to step 704. In step 704, as explained earlier with reference to FIG. 1, the standby mode for alternately and intermittently receiving and monitoring the two channels indicated by the channel data CHDT is set in the handset unit 1. As a result, to place an outgoing call or the like, the handset unit 1 is connected to the base unit 1 via an arbitrary vacant channel. Then, the handset unit 1 is placed in the standby mode for intermittently receiving the two channels as previously described.

In the base unit 2, the processing proceeds from step 804 to 805, whereupon as earlier explained with reference to FIG. 1, the setting of the standby mode is carried out, wherein all channels are repeatedly scanned, received and monitored. As a result, when an incoming call arrives, the base unit 2 is connected to the handset unit 1 via one of the two channels indicated by the channel data CHDT. Then, the base unit 2 is placed in the standby mode for receiving all channels as previously described.

Accordingly the handset unit 1 and the base unit 2 are both placed in the standby mode.

However, if the checked result is abnormal, or if the channel indicated by the channel data CHDT is occupied, as represented by NG at step 802, the processing proceeds from step 802 to step 811. In step 811, a command signal CMND whose control code CTRL indicates the answer to the termination of the telephone conversation and that the channel data CHDT is abnormal is generated and transmitted to the handset unit 1.

Subsequently, the processing proceeds to step 812, whereupon a command signal CMND whose control code CTRL indicates the transmission of the vacant channel data EMCH and the vacant channel data EMCH stored in the RAM 242 is generated and transmitted to the handset unit 1. Then, the processing proceeds to step 813.

In step 703, it is determined whether or not the command signal CMND of step 811 is received by the handset unit 1. Since the command signal CMND indicates the answer to the termination of the telephone conversation and that the channel data CHDT of the base unit 2 is abnormal, the processing proceeds, as indicated by the NG, from step 703 to step 711. In step 711, all channels are sequentially received and monitored so as to detect vacant channels. All vacant channels detected are registered in the RAM 142 as vacant channel data EMCH, and then the processing proceeds to the next decision step 712.

It is determined in step 712 whether or not the command signal CMND of step 812 is received. If the command signal CMND is received as represented by a YES at step 712, then the processing proceeds to step 713. In step 713, the vacant channel data EMCH obtained in step 711 and the vacant channel data EMCH transmitted in step 812 are compared with each other and the data HBEM, which indicates common vacant channels in both groups of the data EMCH, are generated.

Two channels from among the channels indicated by the data HBEM are registered in the RAMs 142 and 242 as the channel data CHDT. When the data HBEM does not include two channels, the channel which is vacant in the base unit 2 is employed as the data HBEM. If no such channel is present, the present channel and the channel next to the present channel are employed as the data HBEM. However, as earlier noted, the specific combinations of channels in which when radio interference occurs in one channel or that channel is disturbed, another channel tends to be disturbed are excluded from the data HBEM.

In the next step 714, a command signal CMND whose control code CTRL indicates the transmission of the data HBEM and the data HBEM obtained in step 713 is generated and transmitted to the base unit 2. The processing then proceeds to step 715.

This command signal CMND from step 714 is detected by the base unit 2 at step 813, as indicated by a YES, and the processing proceeds from step 813 to step 814. In step 814, a corresponding answer is transmitted to the handset unit 1 through a command signal CMND whose control code CTRL indicates the reception of the data HBEM, whereupon the processing proceeds to step 815.

If the above command signal CMND with code CTRL is detected by the handset unit 1 in step 715, then the processing proceeds from step 715 to step 716. In step 716, a command signal CMND, whose control code CTRL indicates that a channel is determined, is transmitted to the base unit 2, and the processing proceeds to step 717. In step 717, the data HBEM is registered in the RAM 142 as the channel data CHDT and the processing proceeds to step 718.

In step 718, the handset unit 1 is set in the standby mode for alternately and intermittently receiving and monitoring the two channels indicated by the channel data CHDT, which is similar to step 704. As a result, to make an outgoing call or the like, the handset unit 1 is connected to the base unit 2 via an arbitrary vacant channel. Then, the handset unit 1 is placed in the standby mode for intermittently receiving the two channels.

Further, in the base unit 2, the command signal CMND transmitted in step 716 is received and detected by the base unit 2 at step 815, as indicated by a YES, and the processing proceeds from step 815 to step 816. In step 816, the data HBEM is registered in the RAM 242 as the channel data CHDT.

In the next step 817, the standby mode for repeatedly scanning, receiving and monitoring all channels is set in the base unit 2, similarly to step 805. In this standby mode, when the base unit 2 is connected to the handset unit 1 when an incoming call or the like arrives, this connection is carried out via one of the two channels indicated by the channel data CHDT. Then, the base unit 2 is placed in the standby mode for receiving all the channels.

Accordingly, the handset unit 1 and the base unit 2 are both placed in the standby mode.

If, on the other hand, it is determined in decision step 712 that the command signal CMND of the vacant channel data EMCH transmitted at step 812 is not received, then the processing proceeds from step 712 to the next decision step 721. In step 721, it is determined whether or not the predetermined limit time, for example, 41 seconds, have passed since the step 712 was executed for the first time.

If the limit time has not yet passed, as represented by a NO at step 721, the processing proceeds from step 721 to step 722 in which the channel is changed to the next channel, and the processing returns from step 722 to step 712. Then, step 712 and the following steps are executed.

However, if the limit time has passed, as represented by a YES at step 721, then the processing proceeds from step 721 to step 725. In this step 725, the handset unit 1 is placed in the standby mode such that all channels are scanned, received and monitored and the handset unit 1 is placed in the sleep mode of, for example, 2.54 seconds each time one scanning cycle is completed. As a result, to make an outgoing call or the like, the handset unit 1 is connected to the base unit 2 via an arbitrary vacant channel. Then, the handset unit 1 is placed in the standby mode for intermittently receiving all channels.

Accordingly, in this case, the handset unit 1 receives and monitors all channels in the standby mode.

In this case, the period of one cycle in which an arbitrary channel is received and monitored and then that channel is received and monitored one more time is approximately 3.74 seconds (that is, 120 milliseconds × 10 channels + 2.54 seconds).

Further, if the answer command signal CMND transmitted in step 814 is not received by the handset unit 1, as represented by a NO at step 715, then the processing proceeds from step 715 to the next decision step 723. In decision step 723, it is determined whether or not the predetermined limit time, for example, 41 seconds, have passed since the step 712 was executed for the first time.

If the predetermined limit time has not passed, as represented by a NO at step 723, the processing proceeds from step 723 to step 724 in which the present channel is changed to the next vacant channel, and then the processing is returned to step 714. Then, step 714 and the following steps are executed.

On the other hand, if the limit time has passed, as represented by a YES at step 723, then the processing proceeds from step 723 to step 725. In step 725, the handset unit 1 is set in the standby mode for intermittently receiving all channels.

If, in the base unit 2, the command signal CMND of the data HBEM transmitted in step 714 is not received, as represented by a NO at step 813, then the processing proceeds from step 813 to the next decision step 821. In step 821, it is determined whether or not the predetermined limit time, for example, 41 seconds, have passed since step 812 was executed for the first time. If the limit time has not yet passed, as represented by a NO at step 821, then the processing proceeds from step 821 to step 822 in which the channel is changed to the next vacant channel. Processing then returns to step 812 whereupon step 812 and the following steps are again executed.

On the other hand, if the limit time has passed, as represented by a YES at step 821, then the processing proceeds from step 821 to step 823. In step 823, the base unit 2 is set in the standby mode in which all channels are scanned, received and monitored. As a result, when an incoming call or the like arrives, the base unit 2 is connected to the handset unit 1 via an arbitrary channel. Then, the base unit 2 is placed in the standby mode for receiving all the channels.

Further, if the command signal CMND transmitted from the handset unit 1 as step 716 is not received by the base unit 2 at step 815, as indicated by a NO, then the processing proceeds from step 815 to step 821, whereupon the processing continues as described above.

As set forth above, according to the present invention, even when the handset unit 1 or the base unit 2 is actuated from a reset condition, two channels of the channel data CHDT can be automatically registered in the RAM 142 of the handset unit 1 and in the RAM 242 of the base unit 2.

Accordingly, when a user purchases the cordless telephone, when the handset unit 1 is not set in the standby mode at the end of the telephone conversation, when the rechargeable battery 151 is not charged so that the battery 151 is fully discharged or when a power failure occurs in the base unit 2, the latest channel data CHDT ca be registered in the RAM 142 and the RAM 242 by powering the handset unit 1 and the base unit 2.

Further, although the channels used to connect the handset unit 1 and the base unit 2 are taken from the two channels indicated by the channel data CHDT registered in the RAMs 142 and 242, these two channels are automatically updated when the telephone communication is finished.

Therefore, even when only two channels are received and monitored by the handset unit 1 in the standby mode, 10 channels are effectively being utilized. Thus, when receiving an incoming call, the base unit 2 can reliably open a communication channel between itself and the handset unit 1.

Furthermore, since the duration of the sleep mode of the handset unit 1 in the above described standby mode is not normally reduced, the power consumption of the rechargeable battery 151 is minimized in this standby mode.

In addition, in a cordless telephone of the type in which the base unit 2 has a microphone and a speaker so as to permit extension calls between the base unit 2 and the handset unit 1 to be performed, such extension calls can be more effectively performed.

Having described preferred embodiments of the present invention with reference to the accompanying drawings, it is to be understood that the invention is not limited to those precise embodiments and that various changes and modifications thereof could be effected by one skilled in the art without departing from the spirit and scope of the invention as defined by the appended claims.

We claim:

1. A cordless telephone comprising:
a base unit connected to a telephone line network;
a handset unit operable for communicating with said base unit by way of a radio link;
means for establishing a standby mode in which said handset unit intermittently monitors a plurality of predetermined channels and for alternatively establishing a low power sleep mode;
means at said base unit for detecting the arrival of an incoming call from said telephone network and for informing said handset unit of said arrival through one of said plurality of predetermined channels,
means for exchanging via said radio link between said base unit and said handset unit information identifying respective available channels thereof;
means for storing information identifying a plurality of said available channels which are the same for both said base unit and said handset unit; and
means for selecting, from among said plurality of available channels, said plurality of predetermined channels which are to be intermittently monitored by said handset in said standby mode, said plurality of predetermined channels consisting of fewer channels than said plurality of available channels.

2. A cordless telephone as in claim 1, wherein said plurality of predetermined channels consists of two channels.

3. A cordless telephone as in claim 2, wherein said handset unit and said base unit each comprise means for monitoring ten channels.

4. A cordless telephone comprising:
a base unit connected to a telephone line network;
a handset unit operable for communicating with said base unit by way of a radio link;
power supply means for each of said base and handset units;
reset means connected between each of said base and handset units and the respective one of said power supply means for detecting initiation of operation of the respective power supply means;
means for establishing a standby mode in which said handset unit intermittently monitors a plurality of predetermined channels and for alternatively establishing a low power sleep mode;
means at said base unit for detecting the arrival of an incoming call from said telephone network and for informing said handset unit of said arrival through one of said plurality of predetermined channels,
means for exchanging via said radio link between said base unit and said handset unit information identifying respective available channels thereof when said reset means detects initiation of operation of said power supply means for said base unit or said handset unit, respectively;
means for storing information identifying a plurality of said available channels which are the same for both said base unit and said handset unit; and
means for selecting, from among said plurality of available channels, said plurality of predetermined channels which are to be intermittently monitored by said handset unit in said standby mode, said plurality of predetermined channels consisting of fewer channels than said plurality of available channels.

5. A cordless telephone comprising:
a base unit connected to a telephone line network;
a handset unit operable for communicating with said base unit by way of a radio link;
means for establishing a standby mode in which said handset unit intermittently monitors a plurality of predetermined channels and for alternatively establishing a low power sleep mode;
means at said base unit for detecting the arrival of an incoming call from said telephone network and for informing said handset unit of said arrival through one of said plurality of predetermined channels,
means for exchanging via said radio link between said base unit and said handset unit information identifying respective available channels thereof when a telephone conversation is complete;
means for storing information identifying a plurality of said available channels which are the same for both said base unit and said handset unit; and
means for selecting, from among said plurality of available channels, said plurality of predetermined channels which are to be intermittently monitored by said handset in said standby mode, said plurality of predetermined channels consisting of fewer channels than said plurality of available channels.

* * * * *